US012621772B2

(12) United States Patent
Elshafie et al.

(10) Patent No.: US 12,621,772 B2
(45) Date of Patent: May 5, 2026

(54) TWO STAGE WAKEUP SIGNALS FOR A LOW POWER RADIO

(71) Applicant: QUALCOMM Incorporated, San Diego, CA (US)

(72) Inventors: Ahmed Elshafie, San Diego, CA (US); Linhai He, San Diego, CA (US); Yuchul Kim, San Diego, CA (US); Wei Yang, San Diego, CA (US); Diana Maamari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 18/357,809

(22) Filed: Jul. 24, 2023

(65) Prior Publication Data

US 2025/0039792 A1     Jan. 30, 2025

(51) Int. Cl.
*H04W 52/02*          (2009.01)
(52) U.S. Cl.
CPC .............................. *H04W 52/0235* (2013.01)
(58) Field of Classification Search
CPC ......... H04W 52/0216; H04W 52/0229; H04W 52/0235; Y02D 30/70

USPC .......................................................... 370/329
See application file for complete search history.

(56) References Cited

U.S. PATENT DOCUMENTS

| | | | |
|---|---|---|---|
| 2018/0098287 A1* | 4/2018 | Ang ................... | H04W 52/0229 |
| 2021/0377861 A1* | 12/2021 | Ang ....................... | H04W 72/23 |
| 2024/0224184 A1* | 7/2024 | Elshafie ............. | H04W 52/0235 |
| 2024/0340792 A1* | 10/2024 | Ang ..................... | H04W 72/231 |

* cited by examiner

*Primary Examiner* — Robert J Lopata
(74) *Attorney, Agent, or Firm* — Holland & Hart LLP

(57) ABSTRACT

Methods, systems, and devices for wireless communications are described. A UE may receive a first stage wakeup signal (WUS) indicating to monitor for a second stage WUS using a low power radio. For example, the first stage WUS may indicate whether to monitor one or more upcoming monitoring occasions for the second stage WUS using the low power radio. The UE may receive the second stage WUS based on receiving the indication included in the first stage WUS. The second stage WUS may indicate for the UE to activate a main radio to monitor for a control channel to receive data transmitted by the network entity. Based on receiving the second stage WUS, the UE may activate the main radio and receive data from the network entity.

26 Claims, 17 Drawing Sheets

130

105

115

Network
Entity

Transceiver

1210

Antenna

1215

Communications
Manager

1220

Memory

Code

1230

1225

1240

Processor

1235

1205

1200

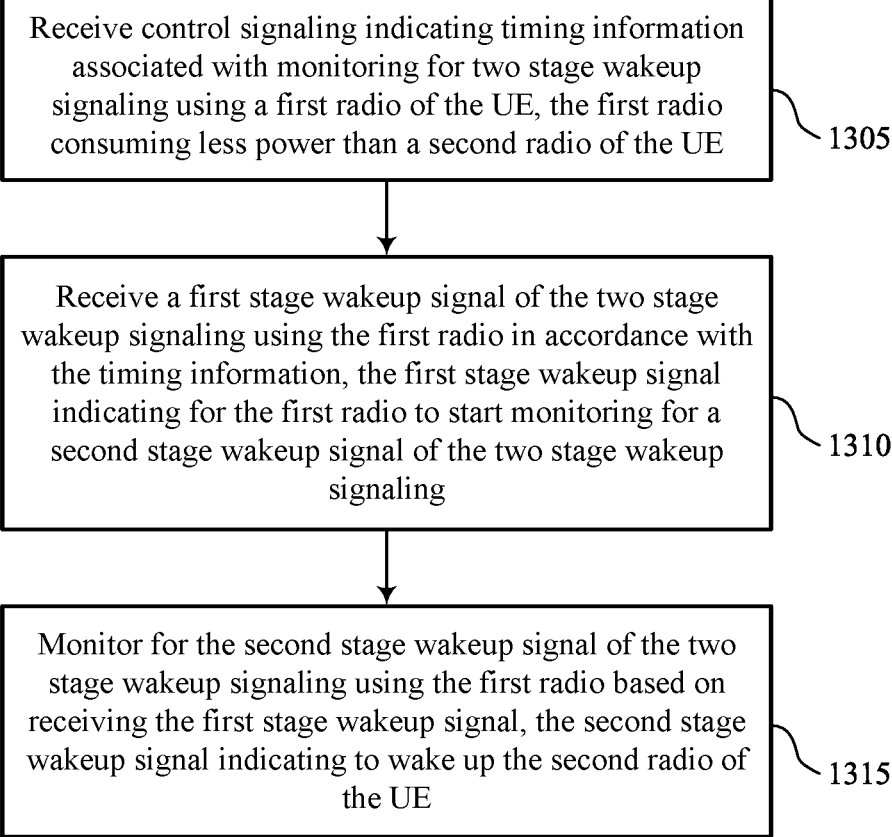

Receive control signaling indicating timing information associated with monitoring for two stage wakeup signaling using a first radio of the UE, the first radio consuming less power than a second radio of the UE

1305

Receive a first stage wakeup signal of the two stage wakeup signaling using the first radio in accordance with the timing information, the first stage wakeup signal indicating for the first radio to start monitoring for a second stage wakeup signal of the two stage wakeup signaling

1310

Monitor for the second stage wakeup signal of the two stage wakeup signaling using the first radio based on receiving the first stage wakeup signal, the second stage wakeup signal indicating to wake up the second radio of the UE

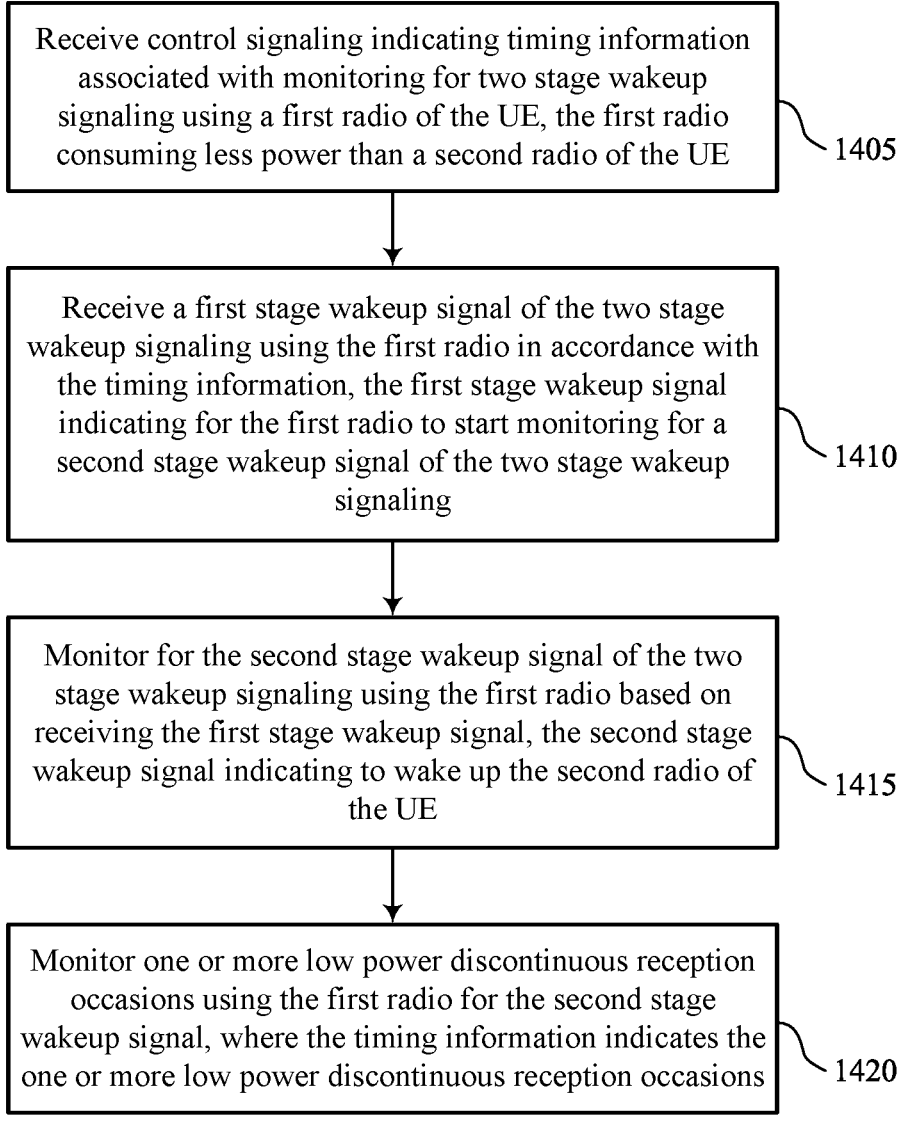

Receive control signaling indicating timing information associated with monitoring for two stage wakeup signaling using a first radio of the UE, the first radio consuming less power than a second radio of the UE

1405

Receive a first stage wakeup signal of the two stage wakeup signaling using the first radio in accordance with the timing information, the first stage wakeup signal indicating for the first radio to start monitoring for a second stage wakeup signal of the two stage wakeup signaling

1410

Monitor for the second stage wakeup signal of the two stage wakeup signaling using the first radio based on receiving the first stage wakeup signal, the second stage wakeup signal indicating to wake up the second radio of the UE

1415

Monitor one or more low power discontinuous reception occasions using the first radio for the second stage wakeup signal, where the timing information indicates the one or more low power discontinuous reception occasions

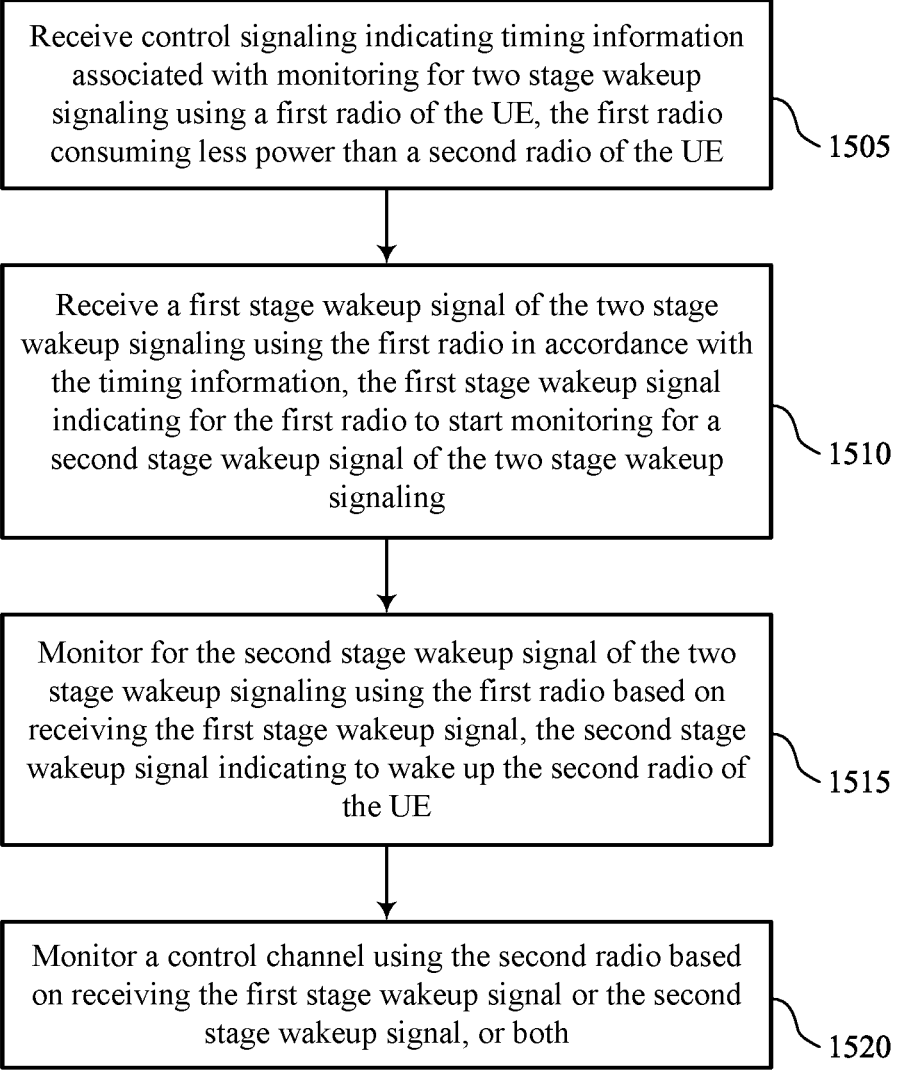

Receive control signaling indicating timing information associated with monitoring for two stage wakeup signaling using a first radio of the UE, the first radio consuming less power than a second radio of the UE

1505

Receive a first stage wakeup signal of the two stage wakeup signaling using the first radio in accordance with the timing information, the first stage wakeup signal indicating for the first radio to start monitoring for a second stage wakeup signal of the two stage wakeup signaling

1510

Monitor for the second stage wakeup signal of the two stage wakeup signaling using the first radio based on receiving the first stage wakeup signal, the second stage wakeup signal indicating to wake up the second radio of the UE

1515

Monitor a control channel using the second radio based on receiving the first stage wakeup signal or the second stage wakeup signal, or both

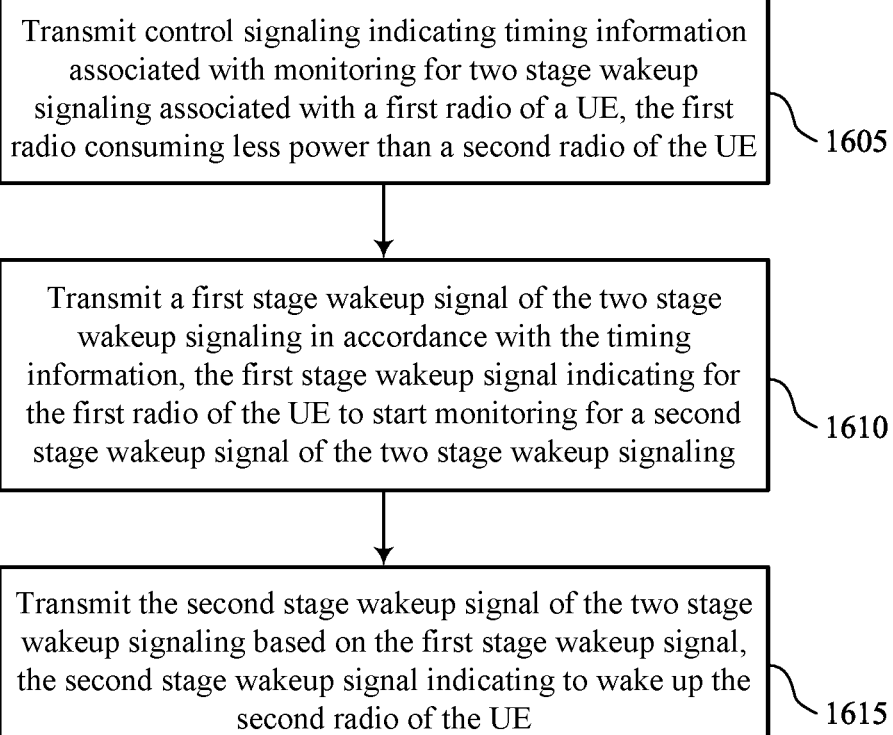

Transmit control signaling indicating timing information associated with monitoring for two stage wakeup signaling associated with a first radio of a UE, the first radio consuming less power than a second radio of the UE

1605

Transmit a first stage wakeup signal of the two stage wakeup signaling in accordance with the timing information, the first stage wakeup signal indicating for the first radio of the UE to start monitoring for a second stage wakeup signal of the two stage wakeup signaling

1610

Transmit the second stage wakeup signal of the two stage wakeup signaling based on the first stage wakeup signal, the second stage wakeup signal indicating to wake up the second radio of the UE

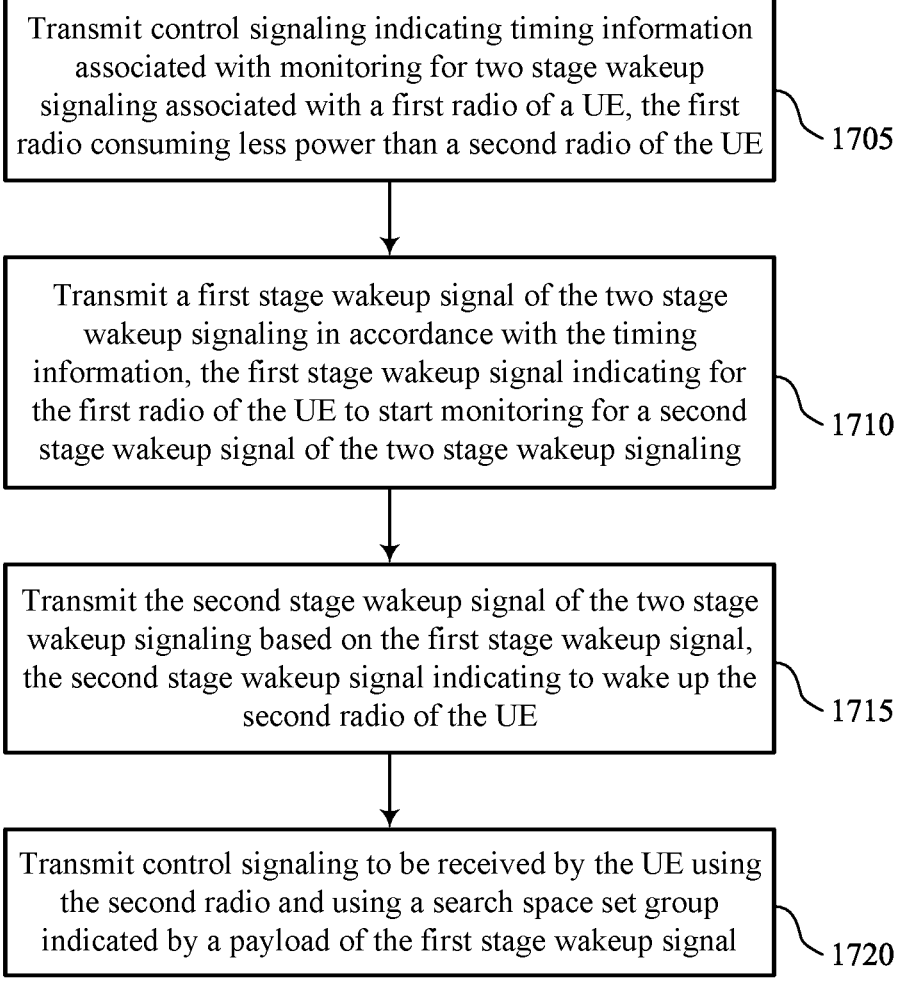

Transmit control signaling indicating timing information associated with monitoring for two stage wakeup signaling associated with a first radio of a UE, the first radio consuming less power than a second radio of the UE

1705

Transmit a first stage wakeup signal of the two stage wakeup signaling in accordance with the timing information, the first stage wakeup signal indicating for the first radio of the UE to start monitoring for a second stage wakeup signal of the two stage wakeup signaling

1710

Transmit the second stage wakeup signal of the two stage wakeup signaling based on the first stage wakeup signal, the second stage wakeup signal indicating to wake up the second radio of the UE

1715

Transmit control signaling to be received by the UE using the second radio and using a search space set group indicated by a payload of the first stage wakeup signal

TWO STAGE WAKEUP SIGNALS FOR A LOW POWER RADIO

FIELD OF TECHNOLOGY

The present disclosure relates to wireless communications, including two stage wakeup signals for a low power radio.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support two stage wakeup signals for a low power radio. For example, the described techniques provide for a user equipment (UE) receiving a first stage wakeup signal (WUS) and a second stage WUS to receive data transmitted by a network entity. Using a low power radio, the UE may receive a first stage WUS indicating to monitor for a second stage WUS which is also received using the low power radio. For example, the first stage WUS may indicate whether to monitor one or more upcoming monitoring occasions for the second stage WUS using the low power radio. The UE may receive the second stage WUS based on receiving the first stage WUS. The second stage WUS may indicate for the UE to activate a main radio to monitor for a control channel to receive data transmitted by a network entity. Based on receiving the second stage WUS, the UE may activate the main radio and receive data from the network entity. In some examples, the first stage WUS may indicate for the UE to skip monitoring for a second state WUS using the low power radio or to skip monitoring for the control channel using the main radio, or both.

A method for wireless communications by a UE is described. The method may include receiving control signaling indicating timing information associated with monitoring for two stage wakeup signaling using a first radio of the UE, the first radio consuming less power than a second radio of the UE, receiving a first stage WUS of the two stage wakeup signaling using the first radio in accordance with the timing information, the first stage WUS indicating for the first radio to start monitoring for a second stage WUS of the two stage wakeup signaling, and monitoring for the second stage WUS of the two stage wakeup signaling using the first radio based on receiving the first stage WUS, the second stage WUS indicating to wake up the second radio of the UE.

A UE for wireless communications is described. The UE may include one or more memories storing processor executable code, and one or more processors coupled with the one or more memories. The one or more processors may individually or collectively operable to execute the code to cause the UE to receive control signaling indicating timing information associated with monitoring for two stage wakeup signaling using a first radio of the UE, the first radio consuming less power than a second radio of the UE, receive a first stage WUS of the two stage wakeup signaling using the first radio in accordance with the timing information, the first stage WUS indicating for the first radio to start monitoring for a second stage WUS of the two stage wakeup signaling, and monitor for the second stage WUS of the two stage wakeup signaling using the first radio based on receiving the first stage WUS, the second stage WUS indicating to wake up the second radio of the UE.

Another UE for wireless communications is described. The UE may include means for receiving control signaling indicating timing information associated with monitoring for two stage wakeup signaling using a first radio of the UE, the first radio consuming less power than a second radio of the UE, means for receiving a first stage WUS of the two stage wakeup signaling using the first radio in accordance with the timing information, the first stage WUS indicating for the first radio to start monitoring for a second stage WUS of the two stage wakeup signaling, and means for monitoring for the second stage WUS of the two stage wakeup signaling using the first radio based on receiving the first stage WUS, the second stage WUS indicating to wake up the second radio of the UE.

A non-transitory computer-readable medium storing code for wireless communications is described. The code may include instructions executable by a processor to receive control signaling indicating timing information associated with monitoring for two stage wakeup signaling using a first radio of the UE, the first radio consuming less power than a second radio of the UE, receive a first stage WUS of the two stage wakeup signaling using the first radio in accordance with the timing information, the first stage WUS indicating for the first radio to start monitoring for a second stage WUS of the two stage wakeup signaling, and monitor for the second stage WUS of the two stage wakeup signaling using the first radio based on receiving the first stage WUS, the second stage WUS indicating to wake up the second radio of the UE.

In some examples of the method, UEs, and non-transitory computer-readable medium described herein, receiving the second stage WUS may include operations, features, means, or instructions for monitoring one or more low power discontinuous reception (DRX) occasions using the first radio for the second stage WUS, where the timing information indicates the one or more low power DRX occasions.

In some examples of the method, UEs, and non-transitory computer-readable medium described herein, receiving the second stage WUS may include operations, features, means, or instructions for monitoring for the second stage WUS beginning at a start time indicated by the first stage WUS or the timing information, or both.

In some examples of the method, UEs, and non-transitory computer-readable medium described herein, the timing information or the first stage WUS, or both, indicates a start time of a time window for monitoring for the second stage WUS, a periodicity of the time window, a duration of the time window, or any combination thereof.

Some examples of the method, UEs, and non-transitory computer-readable medium described herein may further include operations, features, means, or instructions for monitoring a control channel using the second radio based on receiving the first stage WUS or the second stage WUS, or both.

In some examples of the method, UEs, and non-transitory computer-readable medium described herein, monitoring for the control channel may include operations, features, means, or instructions for monitoring for the control channel using the second radio in a search space set group indicated by a payload of the first stage WUS.

Some examples of the method, UEs, and non-transitory computer-readable medium described herein may further include operations, features, means, or instructions for skipping monitoring of an on duration of a DRX cycle, a synchronization signal block (SSB), a radio resource management (RRM) measurement, a radio link monitoring (RLM) measurement, a channel state information reference signal (CSI-RS), a downlink channel, a downlink signal, an uplink channel, an uplink signal, a cell deactivation, a secondary cell switch, a bandwidth part switch for the second radio, or any combination thereof, based on the first stage WUS or the second stage WUS, or both.

In some examples of the method, UEs, and non-transitory computer-readable medium described herein, receiving the second stage WUS may include operations, features, means, or instructions for receiving the second stage WUS while operating in a connected mode.

A method for wireless communications by a network entity is described. The method may include transmitting control signaling indicating timing information associated with monitoring for two stage wakeup signaling associated with a first radio of a UE, the first radio consuming less power than a second radio of the UE, transmitting a first stage WUS of the two stage wakeup signaling in accordance with the timing information, the first stage WUS indicating for the first radio of the UE to start monitoring for a second stage WUS of the two stage wakeup signaling, and transmitting the second stage WUS of the two stage wakeup signaling based on the first stage WUS, the second stage WUS indicating to wake up the second radio of the UE.

A network entity for wireless communications is described. The network entity may include one or more memories storing processor executable code, and one or more processors coupled with the one or more memories. The one or more processors may individually or collectively operable to execute the code to cause the network entity to transmit control signaling indicating timing information associated with monitoring for two stage wakeup signaling associated with a first radio of a UE, the first radio consuming less power than a second radio of the UE, transmit a first stage WUS of the two stage wakeup signaling in accordance with the timing information, the first stage WUS indicating for the first radio of the UE to start monitoring for a second stage WUS of the two stage wakeup signaling, and transmit the second stage WUS of the two stage wakeup signaling based on the first stage WUS, the second stage WUS indicating to wake up the second radio of the UE.

Another network entity for wireless communications is described. The network entity may include means for transmitting control signaling indicating timing information associated with monitoring for two stage wakeup signaling associated with a first radio of a UE, the first radio consuming less power than a second radio of the UE, means for transmitting a first stage WUS of the two stage wakeup signaling in accordance with the timing information, the first stage WUS indicating for the first radio of the UE to start monitoring for a second stage WUS of the two stage wakeup signaling, and means for transmitting the second stage WUS of the two stage wakeup signaling based on the first stage WUS, the second stage WUS indicating to wake up the second radio of the UE.

A non-transitory computer-readable medium storing code for wireless communications is described. The code may include instructions executable by a processor to transmit control signaling indicating timing information associated with monitoring for two stage wakeup signaling associated with a first radio of a UE, the first radio consuming less power than a second radio of the UE, transmit a first stage WUS of the two stage wakeup signaling in accordance with the timing information, the first stage WUS indicating for the first radio of the UE to start monitoring for a second stage WUS of the two stage wakeup signaling, and transmit the second stage WUS of the two stage wakeup signaling based on the first stage WUS, the second stage WUS indicating to wake up the second radio of the UE.

In some examples of the method, network entities, and non-transitory computer-readable medium described herein, transmitting the second stage WUS may include operations, features, means, or instructions for transmitting the second stage WUS during one or more low power DRX occasions associated with the first radio, where the timing information indicates the one or more low power DRX occasions.

In some examples of the method, network entities, and non-transitory computer-readable medium described herein, transmitting the second stage WUS may include operations, features, means, or instructions for transmitting the second stage WUS beginning at a start time indicated by the first stage WUS or the timing information, or both.

In some examples of the method, network entities, and non-transitory computer-readable medium described herein, the timing information or the first stage WUS, or both, indicates a start time of a window for the second stage WUS, a periodicity of the window, a duration of the window, or any combination thereof.

In some examples of the method, network entities, and non-transitory computer-readable medium described herein, the timing information may be based on a jitter of communications between the network entity and the UE.

Some examples of the method, network entities, and non-transitory computer-readable medium described herein may further include operations, features, means, or instructions for transmitting control signaling to be received by the UE using the second radio and using a search space set group indicated by a payload of the first stage WUS.

In some examples of the method, network entities, and non-transitory computer-readable medium described herein, transmitting the first stage WUS may include operations, features, means, or instructions for transmitting the first stage WUS including an indication for the UE to skip an on duration of a DRX cycle, a SSB, a RRM measurement, a RLM measurement, a CSI-RS, a downlink channel, a downlink signal, an uplink channel, an uplink signal, a cell deactivation, a secondary cell switch, a bandwidth part switch for the second radio, or any combination thereof.

BRIEF DESCRIPTION OF THE DRAWINGS

FIGS. 13 through 17 show flowcharts illustrating methods that support two stage wakeup signals for a low power radio in accordance with one or more aspects of the present disclosure.

DETAILED DESCRIPTION

In some wireless communications systems, a user equipment (UE) may be equipped with a main radio for performing communications (e.g., with a network entity) and a low power radio (LP-WUR) with low energy consumption. In some examples, when the UE does not expect to receive transmissions, the UE may deactivate the main radio to conserve power. With the main radio deactivated, the UE may use the LP-WUR to monitor for a low power wakeup signal (LP-WUS) indicating to activate (e.g., wake up) the main radio to monitor for signaling. The LP-WUS may be transmitted during periodic transmission occasions which are indicated by the network. The UE may operate the LP-WUR in an idle mode or a connected mode. For example, when operating in the connected mode, the LP-WUS may indicate that an upcoming transmission occasion (e.g., a discontinuous reception (DRX) active duration) has data for the UE. In some examples, the UE may receive the LP-WUS at inconsistent arrival times due to noise (e.g., jitter). For example, the LP-WUS may arrive earlier than a nominal arrival time (e.g., outside a DRX active duration), and the UE may miss the transmission. In some other examples, the LP-WUS may arrive later than a nominal arrival time, and the UE may wakeup the main radio early, which may consume additional power.

Aspects of the present disclosure are related to two stage wakeup signals (WUS) for communications between a UE and a network entity. A UE may receive a first stage WUS of a two stage WUS using a LP-WUR indicating for the UE to activate the LP-WUR to monitor for a second stage WUS of the two stage WUS. For example, the first stage WUS may indicate whether to monitor one or more upcoming monitoring occasions for the second stage WUS using the LP-WUR or skip an upcoming monitoring occasion or DRX duration. In some examples, the first stage WUS may indicate to the UE whether to activate the main radio to receive data from the network entity. The UE may receive the second stage WUS based on receiving the first stage WUS. In some examples, the second stage WUS may indicate for the UE to activate the main radio to monitor for a control channel and receive data transmitted by the network entity. Based on receiving the second stage WUS, the UE may activate the main radio and receive data from the network entity. In some examples, the UE may activate the main radio according to the DRX configuration indicated in the first stage WUS to accommodate timing errors and receive data from the network entity.

Aspects of the disclosure are initially described in the context of wireless communications systems. Aspects of the disclosure are additionally illustrated with reference to timing diagrams and process flows. Aspects of the disclosure are further illustrated by and described with reference to apparatus diagrams, system diagrams, and flowcharts that relate to two stage WUSs for a low power radio.

Figure 1:
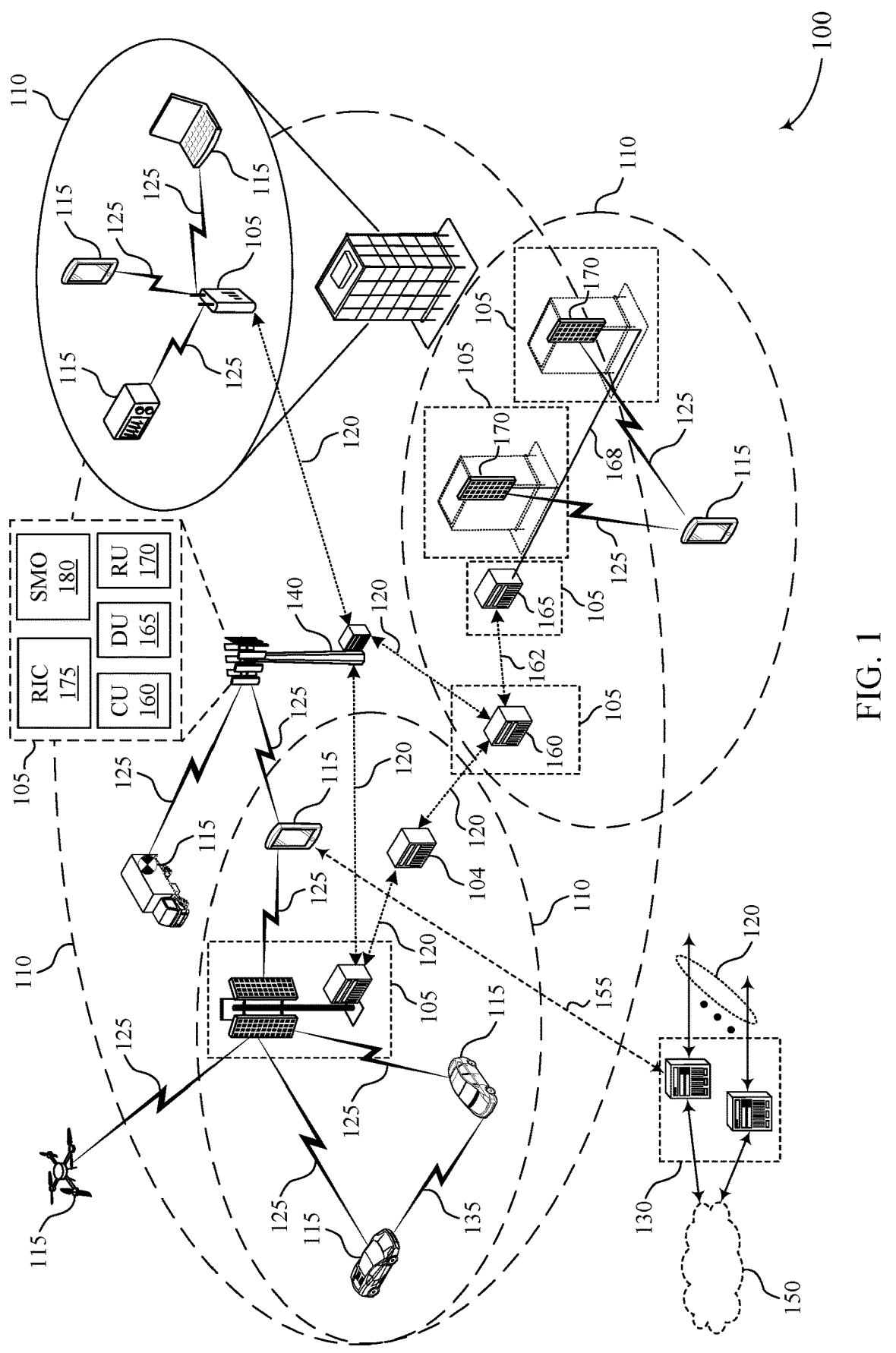
FIG. 1 shows an example of a wireless communications system that supports two stage wakeup signals for a low power radio in accordance with one or more aspects of the present disclosure.

FIG. 1 shows an example of a wireless communications system 100 that supports two stage WUSs for a low power radio in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (cNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support two stage WUSs for a low power radio as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, a UE 115 may be equipped with a main radio and a LP-WUR. The LP-WUR may consume less power top operate than the main radio. The UE 115 may operate the LP-WUR alongside the main radio to reduce power consumption at the UE 115. For example, if the UE 115 does not anticipate on receiving data from a network entity 105, the UE 115 may operate the main radio in an ultra-low power state (ULPS) until the UE 115 needs to transmit or receive data from the network entity 105. While the main radio is in a low-power state (e.g., is deactivated), the UE 115 may operate the LP-WUR to monitor for one or more WUSs (e.g., LP-WUSs) transmitted from the network entity 105 indicating to wake up the main radio for communications. The LP-WUS may indicate to the UE 115 to activate the main radio to receive transmissions from the network entity 105. The network entity 105 may transmit a LP-WUS to the UE 115 based on determining to transmit data to the UE 115. The UE may receive the LP-WUS from the network entity 105 using the LP-WUR and may activate the main radio. Accordingly, the UE 115 may receive data transmitted by the network entity 105 using the main radio. The UE 115 may save power by reducing the frequency of control channel (e.g., physical downlink control channel (PDCCH)) monitoring at the UE 115, which may consume more power than operating the main radio in a low-power state.

A UE 115 may communicate with a network entity 105 using a main radio and an LP-WUR. In some examples, the main radio of the UE 115 may be inactive. In such examples, the UE 115 may receive a first stage WUS using the LP-WUR indicating for the UE to monitor for a second stage WUS from a network entity 105 using the LP-WUR. For example, the first stage WUS may indicate whether to monitor one or more upcoming monitoring occasions for the second stage WUS using the LP-WUR or skip an upcoming monitoring occasion or DRX active duration. Additionally, or alternatively, the first stage WUS may indicate to the UE whether to activate the main radio to receive data from the network entity 105. The UE 115 may receive the second stage WUS based on receiving the indication to monitor included in the first stage WUS. The second stage WUS may indicate for the UE 115 to activate the main radio to monitor for a PDCCH or a physical downlink shared channel (PDSCH) to receive data transmitted by the network entity 105. The duration that the UE 115 monitors for the second stage WUS may be based on one or more predicted or measured jitter conditions to accommodate timing errors in receiving the second stage WUS. Based on receiving the second stage WUS, the UE 115 may activate the main radio and receive data from the network entity 105. In some examples, the UE 115 may activate the main radio according to the DRX configuration indicated in the first stage WUS to accommodate timing errors and receive data from the network entity 105.

Figure 2:
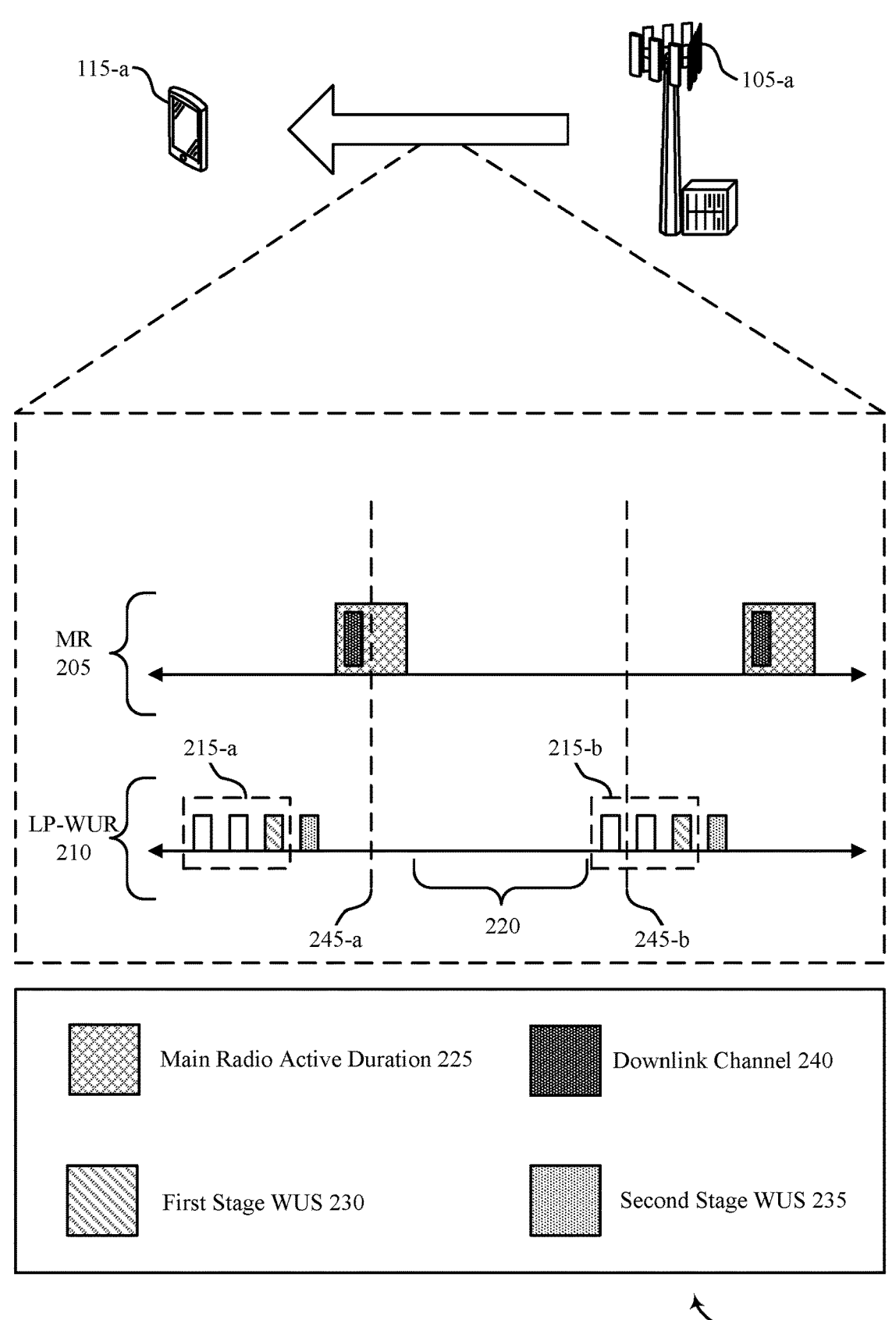
FIG. 2 shows an example of a wireless communications system that supports two stage wakeup signals for a low power radio in accordance with one or more aspects of the present disclosure.

FIG. 2 shows an example of a wireless communications system 200 that supports two stage WUSs for a low power radio in accordance with one or more aspects of the present disclosure. The wireless communications system 200 may include a UE 115-*a* and a network entity 105-*a*, which may be examples of corresponding devices as described herein, including with respect to FIG. 1. The UE 115-*a* and the network entity 105-*a* may communicate via a cellular communication link (e.g., a Uu link). In some examples, the horizontal axis may represent a time component of communications between the UE 115-*a* and the network entity 105-*a*. FIG. 2 shows an example of a communications timeline 205 of a main radio and a communications timeline 210 of an LP-WUR.

The UE 115-*a* may communicate with the network entity 105-*a* using a main radio, a LP-WUR, or a combination thereof. In some examples, the UE 115-*a* may deactivate (e.g., power off) the main radio of the UE 115-*a* to conserve power and may monitor for signals from the network entity 105-*a* using the LP-WUR of the UE 115-*a* to reduce the overall power consumption of the UE 115-*a*. The UE 115-*a* may activate (e.g., power on) the main radio of the UE 115-*a* to receive signaling from the network entity 105-*a* based on receiving a signal (e.g., a WUS) using the LP-WUR. The network entity 105-*a* may configure the UE 115-*a* with a first set of monitoring occasions 215-*a* and a second set of monitoring occasions 215-*b* for monitoring for one or more WUSs.

In some examples, the UE 115-*a* may operate the LP-WUR of the UE 115-*a*, the main radio of the UE 115-*a*, or a combination thereof according to a DRX cycle. For example, the LP-WUR of the UE 115-*a* may be inactive (e.g., in a sleep state) for a sleep duration 220 and may be active for a duration including the first set of monitoring occasions 215-*a* and the second set of monitoring occasions 215-*b*. In some examples, the main radio of the UE 115-*a* may be active during a main radio active duration 225. The DRX cycle of the LP-WUR, the DRX cycle of the main radio, or both may be configured by the network entity 105-*a*, the UE 115-*a*, or a combination thereof, and may be configured to be periodic, aperiodic, or semi-periodic.

The UE may operate the LP-WUR in an idle mode or a connected mode. In the example of FIG. 2, the UE 115-*a* and the network entity 105-*a* may operate in a connected mode. In a connected mode, the UE 115-*a* may utilize the LP-WUR of the UE 115-*a* more frequently than in an idle mode to reduce communication latency, which may increase power consumption. Additionally, the UE 115-*a*, the network entity 105-*a*, or a combination thereof may implement OFDM for more efficient communications. In such examples, OFDM signals may be associated with high power consumption. Accordingly, the wireless communications system 200 may support techniques for reducing power consumption, such as using a two stage WUS. The UE 115-*a* and the network entity 105-*a* may implement a two stage WUS to reduce the overall power consumption of the UE 115-*a*.

The UE 115-*a* may receive a first stage WUS 230 using the LP-WUR during a monitoring occasion of the first set of monitoring occasions 215-*a*, a second set of monitoring occasions 215-*b*, or a combination thereof. In some examples, the first stage WUS 230 may be referred to, or may be an example of, an LP-WUR WUS. The first stage WUS 230 may indicate to the UE 115-*a* whether to activate the LP-WUR of the UE 115-*a*. Additionally, or alternatively, the first stage WUS 230 may indicate to the UE 115-*a* to start monitoring for signals using the LP-WUR of the UE 115-*a*. For example, the first stage WUS 230 may indicate for the UE 115-*a* to start monitoring an LP-WUR DRX cycle using the LP-WUR of the UE 115-*a*. The UE 115-*a* may receive the first stage WUS 230 from the network entity 105-*a*. In some examples, the network entity 105-*a* may transmit the first stage WUS 230 via control signaling (e.g., downlink control information (DCI) 2-6, DCI with cyclic redundancy check (CRC) scrambled by power saving-radio network temporary identifier (PS-RNTI) (DCP)).

Based on receiving the first stage WUS 230, the UE 115-*a* may monitor an LP-WUR DRX cycle for the second stage WUS 235 (e.g., a WUS for the main radio) using the LP-WUR of the UE 115-*a*. In some examples, the second stage WUS may be referred to, or may be an example of, an LP-WUS or an LP-WUR signal. The UE 115-*a* may receive the second stage WUS 235 during an LP-WUR DRX cycle associated with the monitoring occasion of the first stage WUS 230. Based on receiving the second stage WUS 235, the UE 115-*a* may activate the main radio of the UE 115-*a*. The network entity 105-*a* may transmit data to the UE 115-*a* via a downlink channel 240 (e.g., PDCCH, PDSCH), which the UE 115-*a* may receive using the main radio of the UE 115-*a*. In some examples, the UE 115-*a* may receive the downlink channel 240 using the main radio of the UE 115-*a* during the main radio active duration 225.

The UE 115-*a* may monitor for transmissions from the network entity 105-*a* according to a periodicity (e.g., a DRX cycle), but the network entity 105-*a* may transmit signals outside of the periodicity due to noise (e.g., jitter). To accommodate jitter in the wireless communications system 200, the UE 115-*a* may operate the LP-WUR of the UE 115-*a*, the main radio of the UE 115-*a*, or a combination thereof according to the first stage WUS 230. The network entity 105-*a* may transmit the first stage WUS 230 as an always-on signal to assist the UE 115-*a* in receiving transmissions from the network entity 105-*a*.

In some examples, the network entity 105-*a* may transmit the second stage WUS 235 before an expected (e.g., nominal) arrival time 245-*a* (e.g., early arrival). In some cases, the first stage WUS 230 may indicate to the UE 115-*a* to skip monitoring (e.g., deactivate) for the remainder of a current LP-WUR DRX cycle, an upcoming main radio DRX cycle, or a combination thereof. In such cases, the UE 115-*a* may skip monitoring during a DRX cycle that has no data. In some other cases, the first stage WUS 230 may indicate a configuration for a LP-WUR DRX cycle that is adjusted (e.g., earlier in time) to accommodate an early arrival of the second stage WUS 235. In such other cases, the UE 115-*a* may receive the early second stage WUS 235.

In some other examples, the network entity 105-*a* may transmit the second stage WUS 235 after an expected nominal arrival time 245-*b* (e.g., late arrival). In some cases, the first stage WUS 230 may indicate to the UE 115-*a* to skip (e.g., delay) activation of the LP-WUR of the UE 115-*a*, the main radio of the UE 115-*a*, or a combination thereof, until the UE 115-*a* detects the second stage WUS 235. In some other cases, the first stage WUS 230 may indicate a configuration for a LP-WUR DRX cycle that is adjusted (e.g., delayed in time) to accommodate a late arrival of the second stage WUS 235. In such other cases, the UE 115-*a* may receive the late second stage WUS 235.

Additionally, or alternatively, in some cases (e.g., extended reality (XR), ultra-reliable low latency communications (URLLC) or enhanced mobile broadband (eMBB) use cases) the first stage WUS 230 may indicate for the UE 115-*a* to deactivate the LP-WUR of the UE 115-*a* for the remainder of a current LP-WUR DRX cycle, the main radio for an upcoming main radio DRX cycle, or a combination thereof. For example, the upcoming main radio DRX cycle may contain no data, and the first stage WUS 230 may indicate to the UE 115-*a* to skip monitoring using the LP-WUR of the UE 115-*a*, the main radio of the UE 115-*a*, or a combination thereof to save power.

The network entity 105-*a* may indicate timing information for monitoring for the second stage WUS 235 to the UE 115-*a*. For example, the network entity may indicate a start time for the UE 115-*a* to begin monitoring for the second stage WUS 235. The start time may be based on a reference point in time (e.g., a slot). In some examples, the start time from receiving the LP-WUR WUS indication (from a certain reference point or slot) to monitoring signals by LP-WUR may be configured using at least one control message (e.g., RRC, MAC-CE, DCI, a Layer 3 (L3) indication, a Layer 2 (L2) indication, a Layer 1 (L1) indication) or indicated in the LP-WUR WUS (e.g., one or more bits in LP-WUR WUS to indicate one or time offsets). Additionally, or alternatively, the network entity may configure a range (e.g., interval of time, a quantity of monitoring occasions) of the LP-WUR DRX cycle for the UE 115-*a* to monitor using the LP-WUR of the UE 115-*a*. The network entity 105-*a* may configure the range of the LP-WUR DRX cycle based on a prediction of jitter between LP-WUR DRX cycles, a range of jitter, or a combination thereof. For example, the network entity 105-*a* may configure the LP-WUR DRX cycle active time based on jitter, jitter range, an offset, or any combination thereof. Additionally, or alternatively, the network entity may configure the LP-WUR of the UE 115-*a* with an extended DRX active time (e.g., active between DRX cycles) based on measured jitter, predicted jitter, or a combination thereof. The network entity may indicate the configured range via RRC signaling, a MAC-CE, a DCI, the first stage WUS 230, or a combination thereof. In some cases, based on a prediction of jitter from one cycle to another (or just knowledge of jitter range), the network entity 105-*a* may indicate a defined time interval or maximum time interval for the LP-WUR of the UE 115-*a* to monitor. In some cases, the WUR DRX cycle active time may be selected based on statistics of jitter or Jitter range. In some examples, a time offset or extended DRX active duration for the LP-WUR of the UE 115-*a* to monitor may be determined from cycle to cycle based on actual jitter or predicted jitter. In some examples, to enhance detection of a wakeup indication, the network entity 105-*a* may include a LP-WUR WUS indication in a control message, such as a DCP or DCI format 2-6, where UE 115-*a* may receive such indication and thereby wakeup or keep sleeping. DCP may be DCI with cyclic redundancy check (CRC) scrambled by a power saving-radio network temporary identifier (PS-RNTI). In some examples, the LP-WUR WUS indication may be used by the UE 115-*a* to adjust for timing error (e.g., since the LP-WUR WUS indication may be an always ON signal).

In some examples, the network entity 105-*a* may indicate (e.g., explicitly) to the UE 115-*a* to stop monitoring, to enter a sleep state, or a changed configuration of a LP-WUR DRX cycle. For example, the network entity 105-*a* may indicate for the UE 115-*a* to stop monitoring, enter the sleep state, or change the configuration of the LP-WUR DRX cycle via the first stage WUS 230. Additionally, or alternatively, the network entity 105-*a* may dynamically indicate cancellation of at least one signal to be received by the LP-WUR of the UE 115-*a*, such as a low power synchronization signal (LP-SS), a low power reference signal (LP-RS), or a LP-WUS. The network entity may indicate cancellation via the first stage WUS 230, other signals received by the LP-WUR of the UE 115-*a*, or a combination thereof.

In some examples, the UE 115-*a* may not receive the second stage WUS 235. For example, the UE 115-*a* may receive the first stage WUS 230 and monitor an LP-WUR DRX cycle for a second stage WUS 235, but the UE 115-*a* may not receive the second stage WUS 235. If the UE 115-*a* does not receive the second stage WUS 235 during the monitoring time, the UE 115-*a* may begin to monitor using the main radio. For example, if the UE 115-*a* detects the first stage WUS 230 but not the second stage WUS 235, the UE 115-*a* may provide power to the main radio and begin to monitor using the main radio.

In some examples, the main radio of the UE 115-*a* and the LP-WUR of the UE 115-*a* may operate jointly in a time division multiplex (TDM) manner while in connected mode. In such examples, the LP-WUR of the UE 115-*a* may receive an indication for the main radio of the UE 115-*a* to skip (e.g., cancel) receiving one or more control channels from the network entity 105-*a*. The UE 115-*a* may receive the indication in addition to, or as an alternative to the indication received in the first stage WUS 230. The indication may cancel reception of a synchronization signal block (SSB), a radio resource management (RRM) measurement, a radio link monitoring (RLM) measurement, a channel-state information reference signal (CSI-RS), a downlink channel, a downlink signal, an uplink channel, an uplink signal (e.g., uplink buffer status reporting (UL BSR), a dynamic scheduling request (DSR), a scheduling request (SR), physical uplink control channel (PUCCH), a HARQ-ACK, a CSI report, or a combination thereof), a cell deactivation, a service cell switch, a main radio bandwidth part switch, a band of the LP-WUR, a bandwidth of the LP-WUR, a frequency of the LP-WUR, or a combination thereof. Additionally, or alternatively, the network entity 105-*a* may indicate to cancel one or more monitoring occasions or time durations, and the cancellation may include a set of canceled resource blocks or OFDM symbols and slots. The network entity 105-*a* may indicate the cancellation via a bitmap or a codepoint in a table. Additionally, or alternatively, the main radio of the UE 115-*a* may receive an indication to adjust a configuration for receiving signals using the LP-WUR of the UE 115-*a*, an indication to cancel (e.g., skip) a signal, or to stop monitoring for the second stage WUS 235. In some examples, the LP-WUR indication may provide a dynamic indication of cancellation, skipping, or both, of at least one of WUR signals (e.g., LP-SS, LP-RS, LP-WUS). For example, the LP-WUR indication may indicate to skip monitoring or cancel monitoring for one or more occasion of the second stage WUS 235, one or more main radio PDCCH monitoring occasions, or both.

Figure 3:
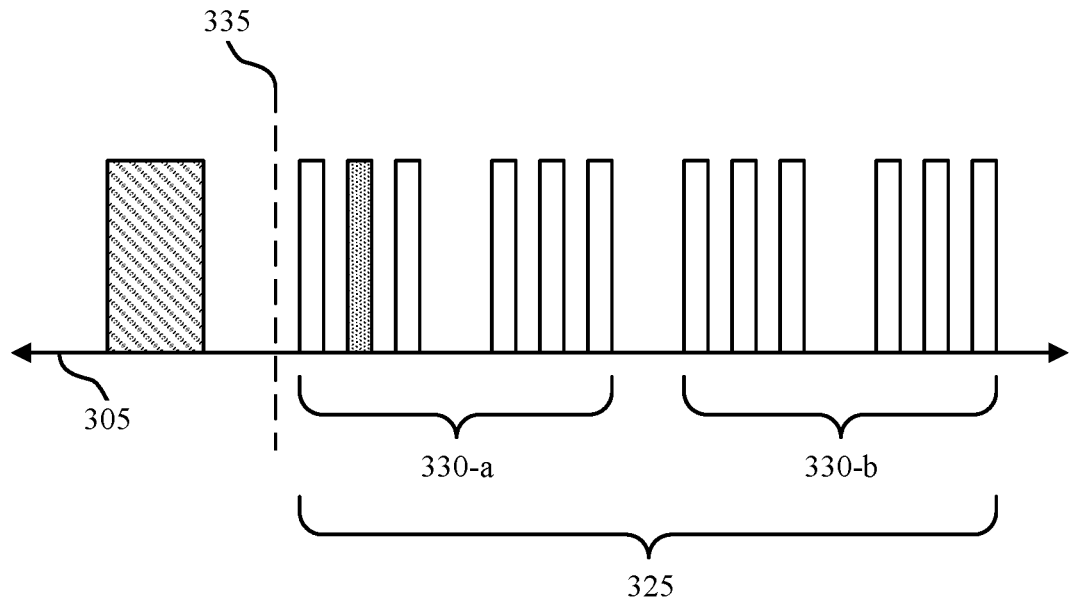
FIG. 3 shows an example of a timing diagram that supports two stage wakeup signals for a low power radio in accordance with one or more aspects of the present disclosure.

FIG. 3 shows an example of a timing diagram 300 that supports two stage WUSs for a low power radio in accordance with one or more aspects of the present disclosure. The timing diagram 300 may implement aspects of the wireless communications system 100, the wireless communications system 200, or a combination thereof, or may be implemented by the wireless communications system 100, the wireless communications system 200, or a combination thereof. In some examples, the horizontal axis 305 may represent a time component of communications between a UE and a network entity (which may be examples of a UE 115 and a network entity 105, respectively) using an LP-WUR. The UE may receive a first stage WUS 310 during a monitoring occasion of a set of first stage WUS monitoring occasions. The first stage WUS 310 may indicate for the UE to monitor the second stage WUS monitoring occasions 315 using the LP-WUR of the UE for a second stage WUS 320 transmitted by the network entity.

In some examples, the UE may be configured with a set of monitoring occasions for the first stage WUS 310. For example, the network entity may configure the UE with multiple first stage WUS monitoring occasions. In some examples, the network entity may configure a periodicity for the first stage WUS monitoring occasions. The UE may monitor the first stage WUS monitoring occasions while operating in a connected mode, an idle mode, or an inactive mode. In some examples, the UE may begin monitoring the first stage WUS monitoring occasions beginning from a time offset of a nominal arrival time of data. For example, the UE may refrain from monitoring the first stage WUS monitoring occasions until a time offset from a DRX on duration (e.g., active time duration of a DRX cycle) of the main radio.

The second stage WUS monitoring occasions 315 may occur during, or represent, a LP-WUR DRX cycle 325. In some examples, the LP-WUR DRX cycle 325 which may include a first DRX configuration 330-*a* and a second DRX configuration 330-*b* configured for a LP-WUR of the UE. The network entity may configure the second stage WUS monitoring occasions 315 for the UE to monitor using the LP-WUR of the UE. In some examples, the network entity may configure the second stage WUS monitoring occasions 315 based on a prediction of jitter between LP-WUR DRX cycles 325, a range of jitter, or a combination thereof. For example, the network entity may configure the second stage WUS monitoring occasions 315 of the LP-WUR DRX cycle 325 based on jitter, jitter range, an offset, or any combination thereof. The network entity may indicate the DRX configuration via RRC signaling, a MAC-CE, a DCI, the first stage WUS 310, or a combination thereof.

In some examples, there may be an association between occasions for the first stage WUS 310 and an LP-WUR DRX configuration 330 (which may be a first DRX configuration 330-*a* or a second DRX configuration 330-*b*). For example, a periodicity between cycles of the LP-WUR DRX configuration 330, an active start time of the LP-WUR DRX configuration 330, a starting time to monitor the LP-WUR DRX configuration 330, or any combination thereof, may be based on the monitoring occasion where the first stage WUS 310 is received. For example, the first stage WUS 310 may be configured to occur periodically between repeated LP-WUR DRX cycles 325 or periodically between the active durations (e.g., second stage WUS monitoring occasions 315) of the first DRX configuration 330-*a*, the second DRX configuration 330-*b*, or a combination thereof. Receiving the first stage WUS 310 may prompt the UE 115-*a* to monitor for occasions the second stage WUS 320 during active time durations of a DRX cycle of the first DRX configuration 330-*a*, the second DRX configuration 330-*b*, or a combination thereof. Additionally, or alternatively, the UE may begin monitoring for the second stage WUS 320 according to a start time 335. The start time 335 may be based on a reference point or a slot (e.g., the monitoring occasion where the first stage WUS 310 is received). In some examples, the association may include a search space set group to be used by a main radio of the UE based on receiving the second stage WUS 320. For example, the first stage WUS 310 may be a payload-based signal (e.g., may include more bits) and may indicate a search space set group to be used by the main radio of the UE for monitoring for one or more control channels.

Figure 4:
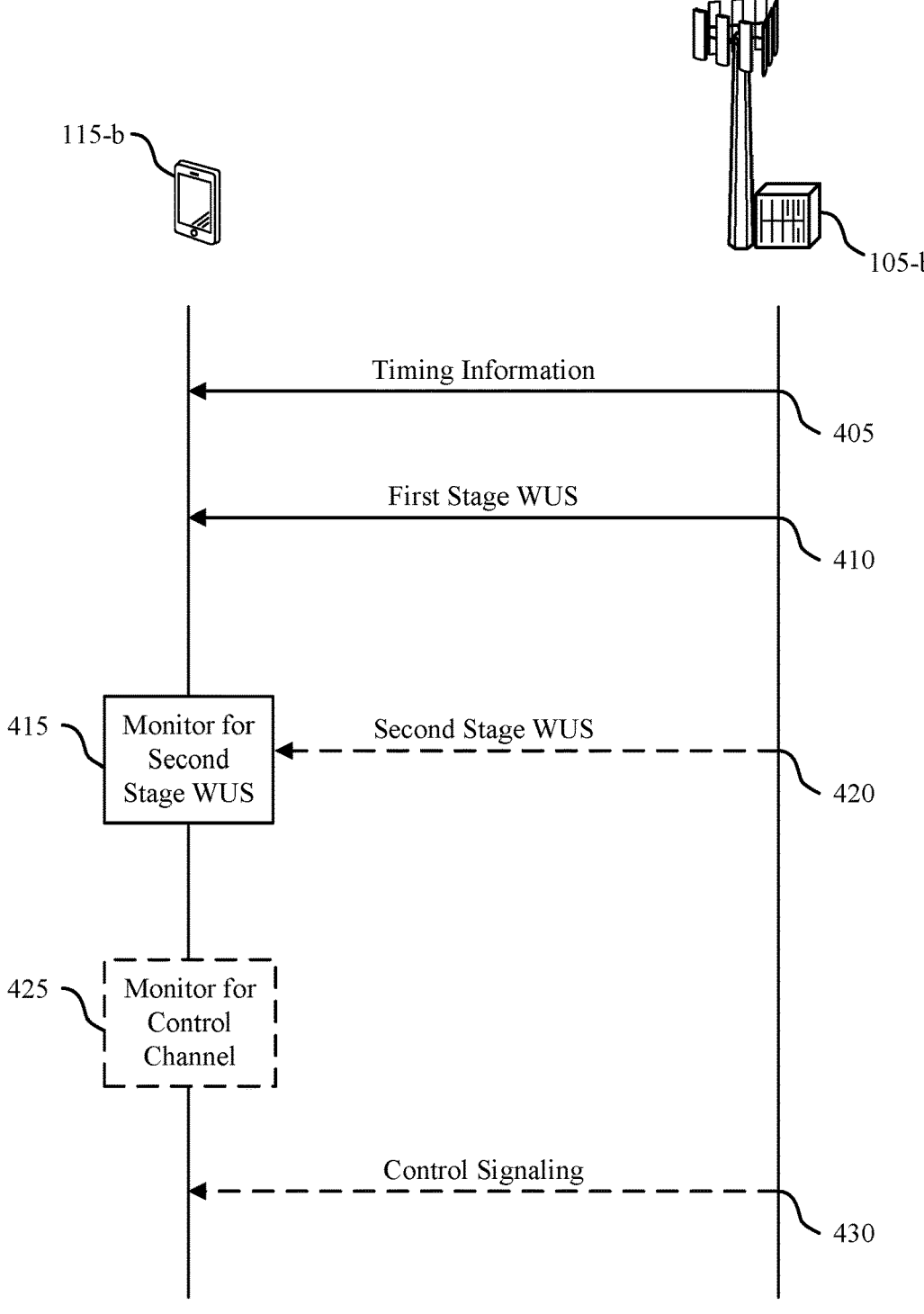
FIG. 4 shows an example of a process flow that supports two stage wakeup signals for a low power radio in accordance with one or more aspects of the present disclosure.

FIG. 4 shows an example of a process flow 400 that supports two stage WUSs for a low power radio in accordance with one or more aspects of the present disclosure. The process flow 400 may implement or be implemented by aspects of the wireless communications system 100 and the wireless communications system 200 as described with reference to FIGS. 1 and 2. For instance, in the example of FIG. 4, a UE 115-*b* may be in communication with a network entity 105-*b*, which may be examples of devices described herein with reference to FIG. 1 or FIG. 2. In the following description of the process flow 400, the operations between the UE 115-*b* and the network entity 105-*b* may be performed in a different order than the example shown, or the operations between the UE 115-*b* and the network entity 105-*b* may be performed in different orders at different times. Some operations may also be omitted form the process flow 400, and other operations may be added to the process flow 400.

At 405, the UE 115-*b* may receive control signaling indicating timing information associated with monitoring for two stage WUS transmissions using a first radio of the UE 115-*b*. The first radio may consume less power than a second radio of the UE 115-*b*. For example, the first radio may be a LP-WUR, and the second radio may be a main radio. In some examples, the timing information may be based on a jitter of communications between the network entity 105-*b* and the UE 115-*b*.

At 410, the network entity 105-*b* may transmit a first stage WUS of the two stage WUS to the UE 115-*b*. The first stage WUS may indicate for the first radio to start monitoring for a second stage WUS of the two stage WUS. For example, the first stage WUS may be an example of an LP-WUR WUS. The UE 115-*b* may receive the first stage WUS of the two stage WUS using the first radio in accordance with the timing information.

At 415, the UE 115-*b* may monitor for the second stage WUS of the two stage WUS using the first radio based on receiving the first stage WUS. The second stage WUS may indicate to wake up the second radio of the UE 115-*b*. The UE 115-*b* may monitor one or more low power DRX occasions using the first radio for the second stage WUS based on the timing information. For example, the timing information may indicate one or more LP-WUR DRX cycles. Additionally, or alternatively, the timing information or the first stage WUS, or both, may indicate a start time of a time window for monitoring for the second stage WUS, a periodicity of the time window, a duration of the time window, or any combination thereof. The UE 115-*b* may monitor for the second stage WUS beginning at a start time indicated by the first stage WUS or the timing information, or both.

At 420, the network entity 105-*b* may transmit the second stage WUS to the UE 115-*b*. The UE 115-*b* may receive the second stage WUS while operating in a connected mode. In some examples, the network entity 105-*b* may transmit the second stage WUS during one or more low power DRX occasions associated with the first radio and indicated in the timing information. Additionally, or alternatively, the network entity 105-*b* may transmit the second stage WUS beginning at a start time indicated by the first stage WUS or the timing information, or both.

At 425, the UE 115-*b* may monitor for a control channel using the second radio based on receiving the first stage WUS or the second stage WUS, or both. The UE 115-*b* may monitor for the control channel using the second radio in a search space set group indicated by a payload of the first stage WUS.

In some examples, the UE 115-*b* may skip monitoring of an on duration of a DRX cycle, a SSB, a RRC measurement, a RLM measurement, a CSI-RS, a downlink channel, a downlink signal, an uplink channel, an uplink signal, a cell deactivation, a secondary cell switch, a bandwidth part switch for the second radio, or any combination thereof, based on the first stage WUS or the second stage WUS, or both.

At 430, the network entity 105-*b* may transmit control signaling to be received by the UE 115-*b* using the second radio. In some examples, the control signaling may be PDCCH signaling, or PDSCH signaling, or both. In some examples, the network entity 105-*b* may transmit the control signaling using a search space set group indicated by a payload of the first stage WUS.

The techniques discussed herein may be used to save power and reduce errors due to LP-WUS low complexity, for XR, URLLC or eMBB use cases, where a low power signal can be used to indicate 1) DRX configuration or start monitoring; 2) DRX skipping or LP WUR signals monitoring skipping, or both. In the LP signal indication (e.g., LP-WUR part 1 or a low power signal or a sync or reference signal), the UE may determine whether to monitor the current DRX cycle. This may help with applications such as URLLC or eMBB where there may be no data during some DRX cycles. Then, if UE was indicated to monitor, it starts to turn ON LP-WUR (perhaps after a time offset from LP-WUR WUS). Then, LP-WUR will monitor until a duration of time (e.g., configured based on a defined amount of jitter or a max jitter value). If UE does not receive LP-WUS during the monitoring time, the UE will start to monitor using the MR.

Figure 5:
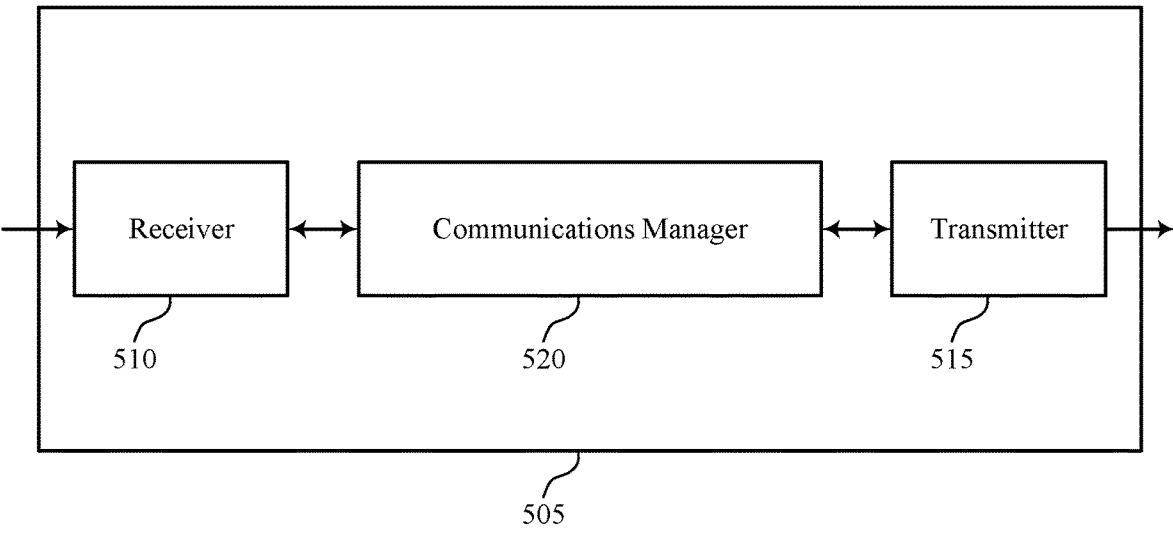
FIGS. 5 and 6 show block diagrams of devices that support two stage wakeup signals for a low power radio in accordance with one or more aspects of the present disclosure.

FIG. 5 shows a block diagram 500 of a device 505 that supports two stage WUSs for a low power radio in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may also include one or more processors, memory coupled with the one or more processors, and instructions stored in the memory that are executable by the one or more processors to enable the one or more processors to perform the low power radio features discussed herein. Each of these components may be in communication with one another (e.g., via one or more buses).

The receiver 510 may provide a means for receiving information such as packets, user data, control information, or any combination thereof associated with various information channels (e.g., control channels, data channels, information channels related to two stage WUSs for a low power radio). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to two stage WUSs for a low power radio). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of two stage WUSs for a low power radio as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for receiving control signaling indicating timing information associated with monitoring for two stage wakeup signaling using a first radio of the UE, the first radio consuming less power than a second radio of the UE. The communications manager 520 is capable of, configured to, or operable to support a means for receiving a first stage WUS of the two stage wakeup signaling using the first radio in accordance with the timing information, the first stage WUS indicating for the first radio to start monitoring for a second stage WUS of the two stage wakeup signaling. The communications manager 520 is capable of, configured to, or operable to support a means for monitoring for the second stage WUS of the two stage wakeup signaling using the first radio based on receiving the first stage WUS, the second stage WUS indicating to wake up the second radio of the UE.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for reduced power consumption.

Figure 6:
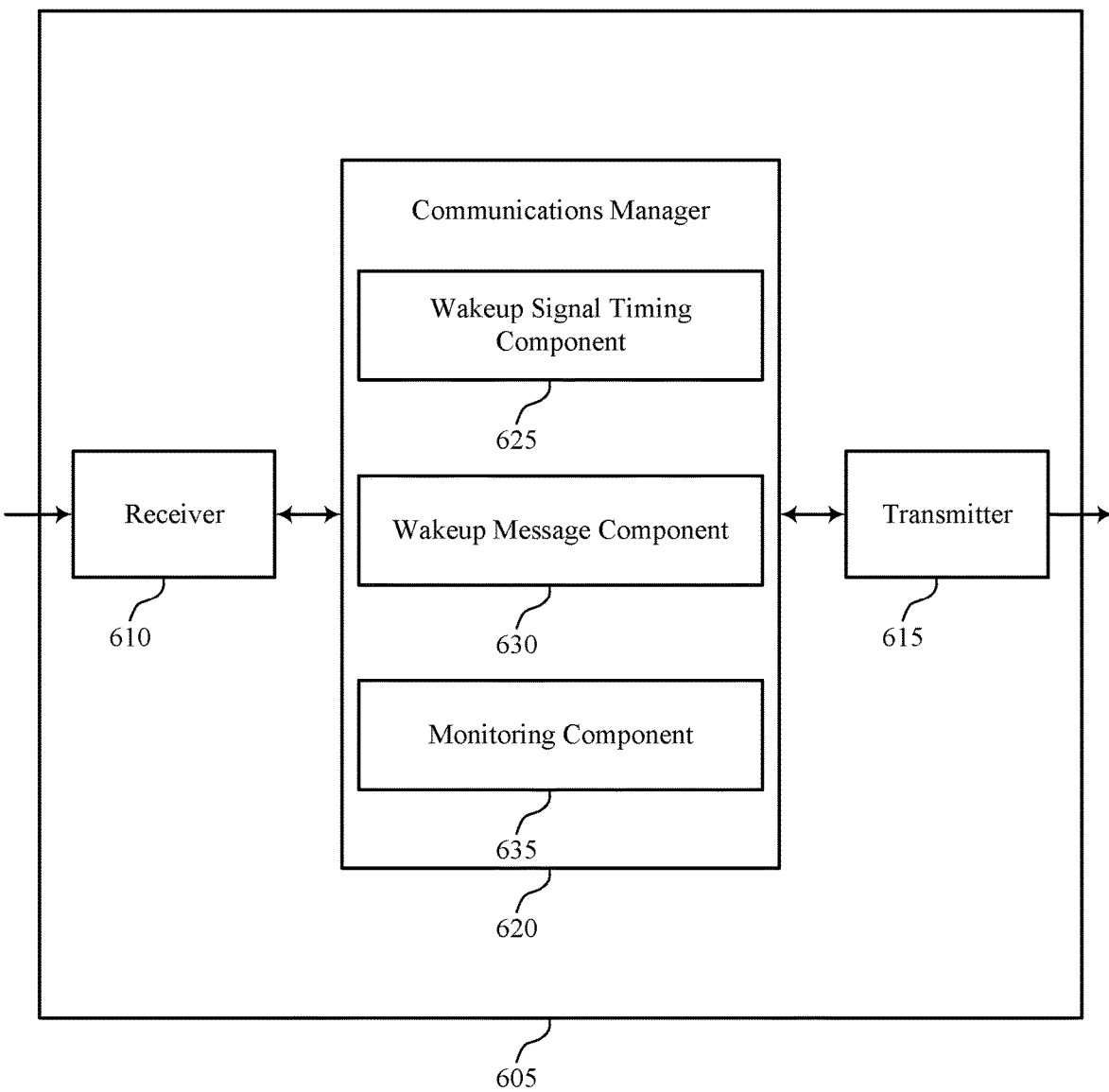

FIG. 6 shows a block diagram 600 of a device 605 that supports two stage WUSs for a low power radio in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to two stage WUSs for a low power radio). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to two stage WUSs for a low power radio). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of two stage WUSs for a low power radio as described herein. For example, the communications manager 620 may include a wakeup signal timing component 625, a wakeup message component 630, a monitoring component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The wakeup signal timing component 625 is capable of, configured to, or operable to support a means for receiving control signaling indicating timing information associated with monitoring for two stage wakeup signaling using a first radio of the UE, the first radio consuming less power than a second radio of the UE. The wakeup message component 630 is capable of, configured to, or operable to support a means for receiving a first stage WUS of the two stage wakeup signaling using the first radio in accordance with the timing information, the first stage WUS indicating for the first radio to start monitoring for a second stage WUS of the two stage wakeup signaling. The monitoring component 635 is capable of, configured to, or operable to support a means for monitoring for the second stage WUS of the two stage wakeup signaling using the first radio based on receiving the first stage WUS, the second stage WUS indicating to wake up the second radio of the UE.

In some cases, the wakeup signal timing component 625, the wakeup message component 630, and the monitoring component 635 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the wakeup signal timing component 625, the wakeup message component 630, and the monitoring component 635 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
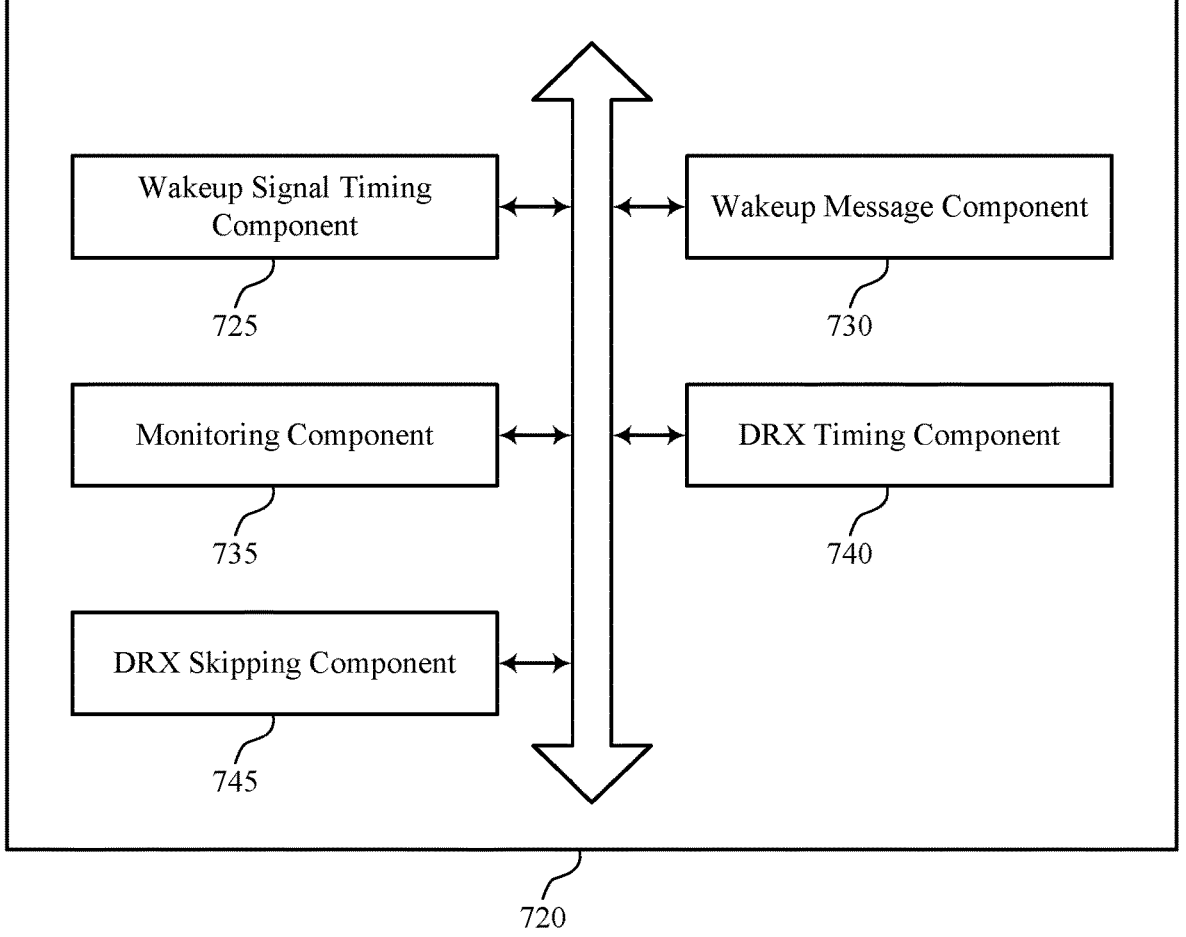
FIG. 7 shows a block diagram of a communications manager that supports two stage wakeup signals for a low power radio in accordance with one or more aspects of the present disclosure.

FIG. 7 shows a block diagram 700 of a communications manager 720 that supports two stage WUSs for a low power radio in accordance with one or more aspects of the present disclosure. The communications manager 720 may be an example of aspects of a communications manager 520, a communications manager 620, or both, as described herein. The communications manager 720, or various components thereof, may be an example of means for performing various aspects of two stage WUSs for a low power radio as described herein. For example, the communications manager 720 may include a wakeup signal timing component 725, a wakeup message component 730, a monitoring component 735, a DRX timing component 740, a DRX skipping component 745, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The wakeup signal timing component 725 is capable of, configured to, or operable to support a means for receiving control signaling indicating timing information associated with monitoring for two stage wakeup signaling using a first radio of the UE, the first radio consuming less power than a second radio of the UE. The wakeup message component 730 is capable of, configured to, or operable to support a means for receiving a first stage WUS of the two stage wakeup signaling using the first radio in accordance with the timing information, the first stage WUS indicating for the first radio to start monitoring for a second stage WUS of the two stage wakeup signaling. The monitoring component 735 is capable of, configured to, or operable to support a means for monitoring for the second stage WUS of the two stage wakeup signaling using the first radio based on receiving the first stage WUS, the second stage WUS indicating to wake up the second radio of the UE.

In some examples, to support receiving the second stage WUS, the DRX timing component 740 is capable of, configured to, or operable to support a means for monitoring one or more low power discontinuous reception occasions using the first radio for the second stage WUS, where the timing information indicates the one or more low power discontinuous reception occasions.

In some examples, to support receiving the second stage WUS, the monitoring component 735 is capable of, configured to, or operable to support a means for monitoring for the second stage WUS beginning at a start time indicated by the first stage WUS or the timing information, or both.

In some examples, the timing information or the first stage WUS, or both, indicates a start time of a time window for monitoring for the second stage WUS, a periodicity of the time window, a duration of the time window, or any combination thereof.

In some examples, the monitoring component 735 is capable of, configured to, or operable to support a means for monitoring a control channel using the second radio based on receiving the first stage WUS or the second stage WUS, or both.

In some examples, to support monitoring for the control channel, the monitoring component 735 is capable of, configured to, or operable to support a means for monitoring for the control channel using the second radio in a search space set group indicated by a payload of the first stage WUS.

In some examples, the DRX skipping component 745 is capable of, configured to, or operable to support a means for skipping monitoring of an on duration of a DRX cycle, a SSB, a RRM measurement, a RLM measurement, a CSI-RS, a downlink channel, a downlink signal, an uplink channel, an uplink signal, a cell deactivation, a secondary cell switch, a bandwidth part switch for the second radio, or any combination thereof, based on the first stage WUS or the second stage WUS, or both.

In some examples, to support receiving the second stage WUS, the wakeup message component 730 is capable of, configured to, or operable to support a means for receiving the second stage WUS while operating in a connected mode.

In some cases, the wakeup signal timing component 725, the wakeup message component 730, the monitoring component 735, the DRX timing component 740, and the DRX skipping component 745 may each be or at be at least a part of a processor (e.g., a transceiver processor, or a radio processor, or a transmitter processor, or a receiver processor). The processor may be coupled with memory and execute instructions stored in the memory that enable the processor to perform or facilitate the features of the wakeup signal timing component 725, the wakeup message component 730, the monitoring component 735, the DRX timing component 740, and the DRX skipping component 745 discussed herein.

Figure 8:
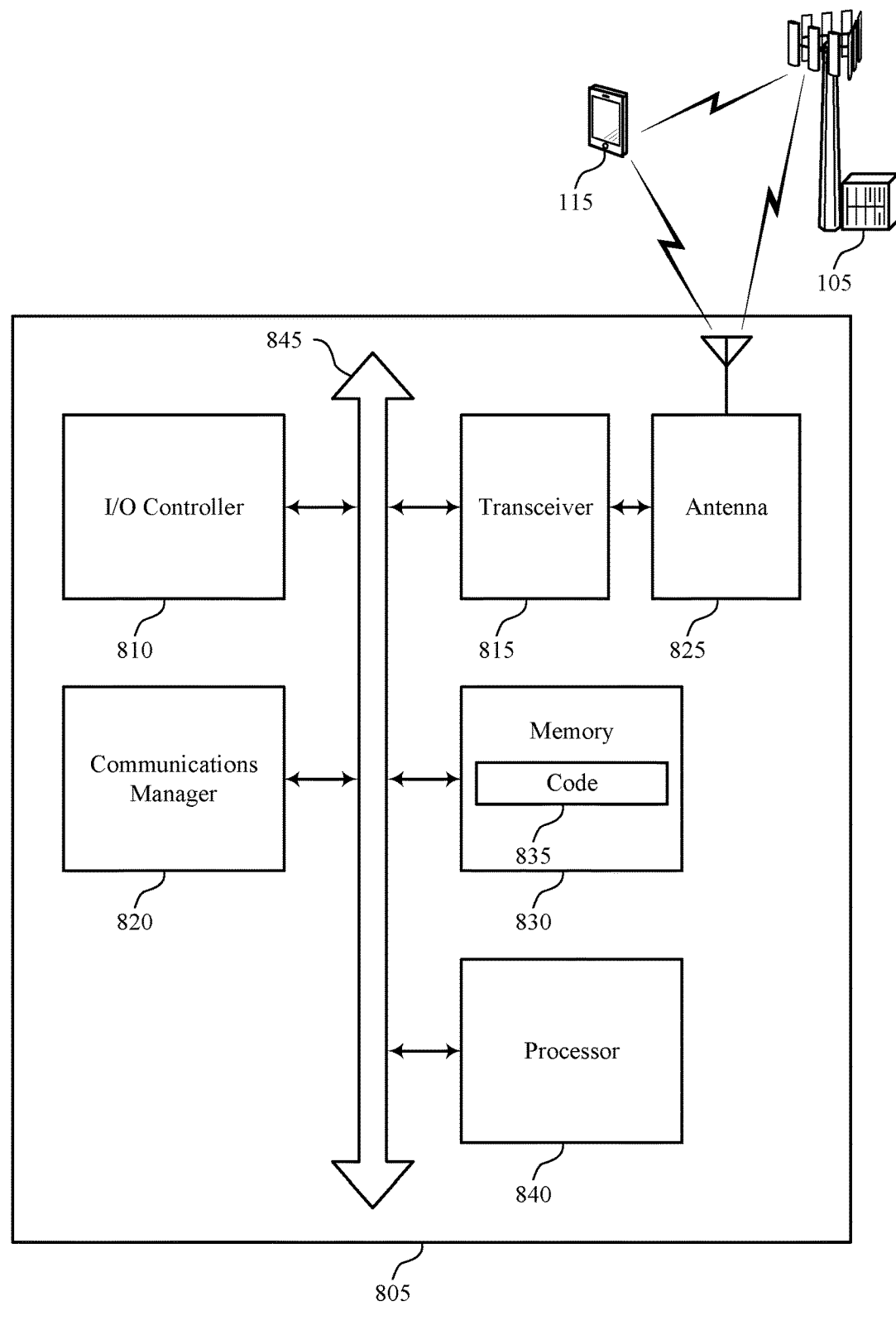
FIG. 8 shows a diagram of a system including a device that supports two stage wakeup signals for a low power radio in accordance with one or more aspects of the present disclosure.

FIG. 8 shows a diagram of a system 800 including a device 805 that supports two stage WUSs for a low power radio in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting two stage WUSs for a low power radio). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein.

The communications manager 820 may support wireless communications in accordance with examples as disclosed herein. For example, the communications manager 820 is capable of, configured to, or operable to support a means for receiving control signaling indicating timing information associated with monitoring for two stage wakeup signaling using a first radio of the UE, the first radio consuming less power than a second radio of the UE. The communications manager 820 is capable of, configured to, or operable to support a means for receiving a first stage WUS of the two stage wakeup signaling using the first radio in accordance with the timing information, the first stage WUS indicating for the first radio to start monitoring for a second stage WUS of the two stage wakeup signaling. The communications manager 820 is capable of, configured to, or operable to support a means for monitoring for the second stage WUS of the two stage wakeup signaling using the first radio based on receiving the first stage WUS, the second stage WUS indicating to wake up the second radio of the UE.

By including or configuring the communications manager 820 in accordance with examples as described herein, the device 805 may support techniques for reduced latency and improved user experience related to reduced power consumption, such as a longer battery life.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of two stage WUSs for a low power radio as described herein, or the at least one processor 840 and the at least one memory 830 may be otherwise configured to, individually or collectively, perform or support such operations.

Figure 9:
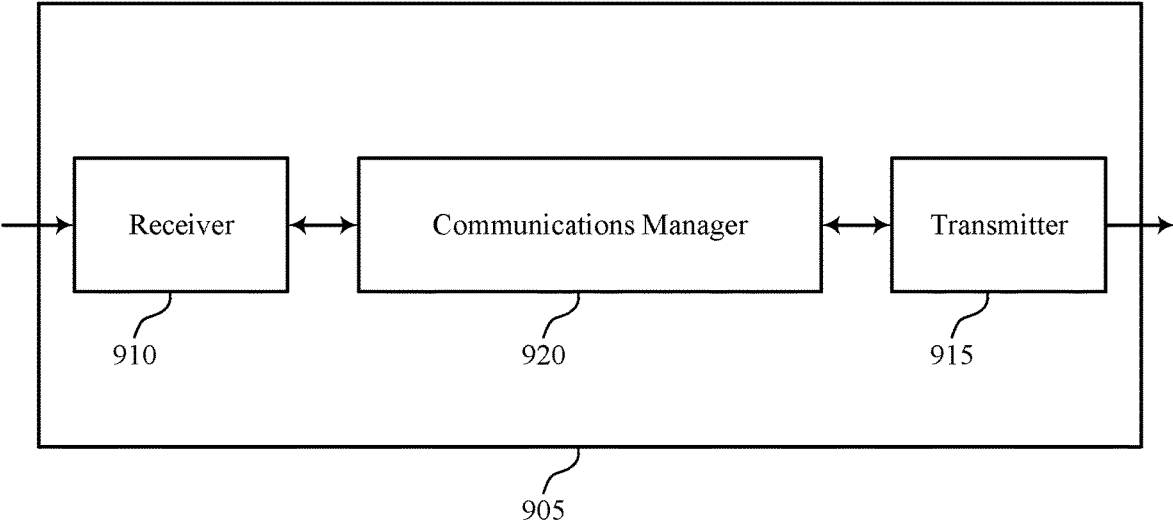
FIGS. 9 and 10 show block diagrams of devices that support two stage wakeup signals for a low power radio in accordance with one or more aspects of the present disclosure.

FIG. 9 shows a block diagram 900 of a device 905 that supports two stage WUSs for a low power radio in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of two stage WUSs for a low power radio as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for transmitting control signaling indicating timing information associated with monitoring for two stage wakeup signaling associated with a first radio of a UE, the first radio consuming less power than a second radio of the UE. The communications manager 920 is capable of, configured to, or operable to support a means for transmitting a first stage WUS of the two stage wakeup signaling in accordance with the timing information, the first stage WUS indicating for the first radio of the UE to start monitoring for a second stage WUS of the two stage wakeup signaling. The communications manager 920 is capable of, configured to, or operable to support a means for transmitting the second stage WUS of the two stage wakeup signaling based on the first stage WUS, the second stage WUS indicating to wake up the second radio of the UE.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for reduced power consumption.

Figure 10:
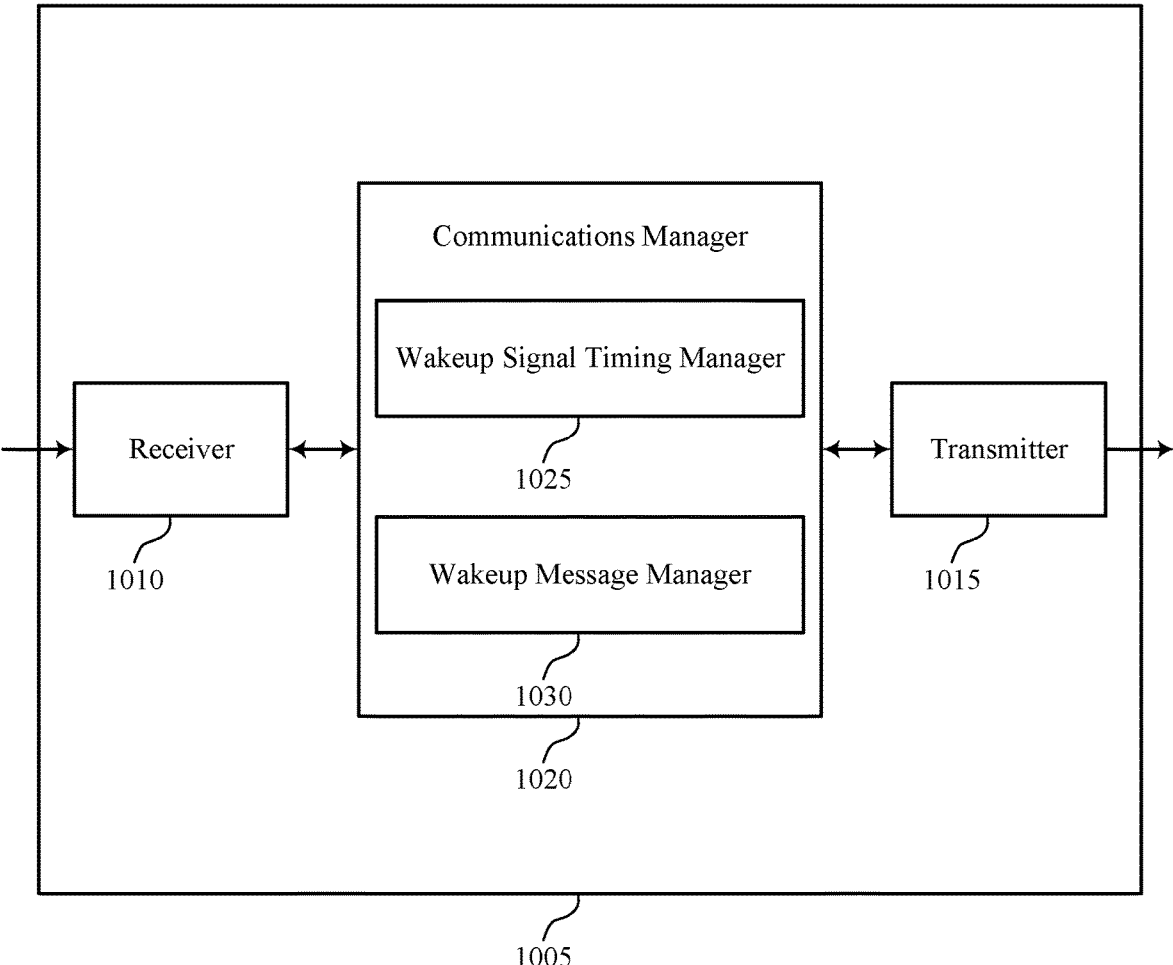

FIG. 10 shows a block diagram 1000 of a device 1005 that supports two stage WUSs for a low power radio in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of two stage WUSs for a low power radio as described herein. For example, the communications manager 1020 may include a wakeup signal timing manager 1025 a wakeup message manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The wakeup signal timing manager 1025 is capable of, configured to, or operable to support a means for transmitting control signaling indicating timing information associated with monitoring for two stage wakeup signaling associated with a first radio of a UE, the first radio consuming less power than a second radio of the UE. The wakeup message manager 1030 is capable of, configured to, or operable to support a means for transmitting a first stage WUS of the two stage wakeup signaling in accordance with the timing information, the first stage WUS indicating for the first radio of the UE to start monitoring for a second stage WUS of the two stage wakeup signaling. The wakeup message manager 1030 is capable of, configured to, or operable to support a means for transmitting the second stage WUS of the two stage wakeup signaling based on the first stage WUS, the second stage WUS indicating to wake up the second radio of the UE.

Figure 11:
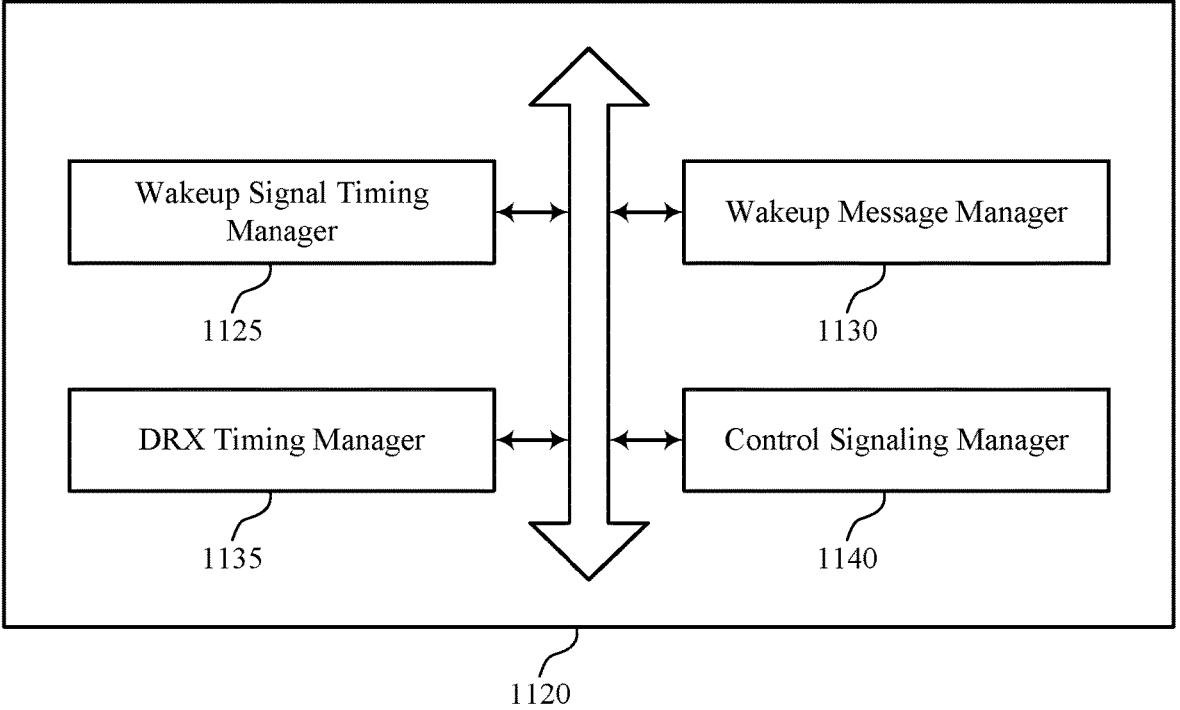
FIG. 11 shows a block diagram of a communications manager that supports two stage wakeup signals for a low power radio in accordance with one or more aspects of the present disclosure.

FIG. 11 shows a block diagram 1100 of a communications manager 1120 that supports two stage WUSs for a low power radio in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of two stage WUSs for a low power radio as described herein. For example, the communications manager 1120 may include a wakeup signal timing manager 1125, a wakeup message manager 1130, a DRX timing manager 1135, a control signaling manager 1140, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The wakeup signal timing manager 1125 is capable of, configured to, or operable to support a means for transmitting control signaling indicating timing information associated with monitoring for two stage wakeup signaling associated with a first radio of a UE, the first radio consuming less power than a second radio of the UE. The wakeup message manager 1130 is capable of, configured to, or operable to support a means for transmitting a first stage WUS of the two stage wakeup signaling in accordance with the timing information, the first stage WUS indicating for the first radio of the UE to start monitoring for a second stage WUS of the two stage wakeup signaling. In some examples, the wakeup message manager 1130 is capable of, configured to, or operable to support a means for transmitting the second stage WUS of the two stage wakeup signaling based on the first stage WUS, the second stage WUS indicating to wake up the second radio of the UE.

In some examples, to support transmitting the second stage WUS, the DRX timing manager 1135 is capable of, configured to, or operable to support a means for transmitting the second stage WUS during one or more low power discontinuous reception occasions associated with the first radio, where the timing information indicates the one or more low power discontinuous reception occasions.

In some examples, to support transmitting the second stage WUS, the wakeup message manager 1130 is capable of, configured to, or operable to support a means for transmitting the second stage WUS beginning at a start time indicated by the first stage WUS or the timing information, or both.

In some examples, the timing information or the first stage WUS, or both, indicates a start time of a window for the second stage WUS, a periodicity of the window, a duration of the window, or any combination thereof.

In some examples, the timing information is based on a jitter of communications between the network entity and the UE.

In some examples, the control signaling manager 1140 is capable of, configured to, or operable to support a means for transmitting control signaling to be received by the UE using the second radio and using a search space set group indicated by a payload of the first stage WUS.

In some examples, to support transmitting the first stage WUS, the wakeup message manager 1130 is capable of, configured to, or operable to support a means for transmitting the first stage WUS including an indication for the UE to skip an on duration of a DRX cycle, a SSB, a RRM measurement, a RLM measurement, a CSI-RS, a downlink channel, a downlink signal, an uplink channel, an uplink signal, a cell deactivation, a secondary cell switch, a bandwidth part switch for the second radio, or any combination thereof.

Figure 12:
FIG. 12 shows a diagram of a system including a device that supports two stage wakeup signals for a low power radio in accordance with one or more aspects of the present disclosure.

FIG. 12 shows a diagram of a system 1200 including a device 1205 that supports two stage WUSs for a low power radio in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting two stage WUSs for a low power radio).

For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some implementations, the at least one processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the at least one processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for transmitting control signaling indicating timing information associated with monitoring for two stage wakeup signaling associated with a first radio of a UE, the first radio consuming less power than a second radio of the UE. The communications manager 1220 is capable of, configured to, or operable to support a means for transmitting a first stage WUS of the two stage wakeup signaling in accordance with the timing information, the first stage WUS indicating for the first radio of the UE to start monitoring for a second stage WUS of the two stage wakeup signaling. The communications manager 1220 is capable of, configured to, or operable to support a means for transmitting the second stage WUS of the two stage wakeup signaling based on the first stage WUS, the second stage WUS indicating to wake up the second radio of the UE.

By including or configuring the communications manager 1220 in accordance with examples as described herein, the device 1205 may support techniques for reduced latency and improved user experience related to reduced power consumption, such as a longer battery life.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of two stage WUSs for a low power radio as described herein, or the at least one processor 1235 and the at least one memory 1225 may be otherwise configured to, individually or collectively, perform or support such operations.

FIG. 13 shows a flowchart illustrating a method 1300 that supports two stage WUSs for a low power radio in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving control signaling indicating timing information associated with monitoring for two stage wakeup signaling using a first radio of the UE, the first radio consuming less power than a second radio of the UE. The operations of block 1305 may be performed in accordance with examples as disclosed herein. In some examples, aspects of the operations of 1305 may be performed by a wakeup signal timing component 725 as described with reference to FIG. 7.

At 1310, the method may include receiving a first stage WUS of the two stage wakeup signaling using the first radio in accordance with the timing information, the first stage WUS indicating for the first radio to start monitoring for a second stage WUS of the two stage wakeup signaling. The operations of block 1310 may be performed in accordance with examples as disclosed herein. In some examples, aspects of the operations of 1310 may be performed by a wakeup message component 730 as described with reference to FIG. 7.

At 1315, the method may include monitoring for the second stage WUS of the two stage wakeup signaling using the first radio based on receiving the first stage WUS, the second stage WUS indicating to wake up the second radio of the UE. The operations of block 1315 may be performed in accordance with examples as disclosed herein. In some examples, aspects of the operations of 1315 may be performed by a monitoring component 735 as described with reference to FIG. 7.

FIG. 14 shows a flowchart illustrating a method 1400 that supports two stage WUSs for a low power radio in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving control signaling indicating timing information associated with monitoring for two stage wakeup signaling using a first radio of the UE, the first radio consuming less power than a second radio of the UE. The operations of block 1405 may be performed in accordance with examples as disclosed herein. In some examples, aspects of the operations of 1405 may be performed by a wakeup signal timing component 725 as described with reference to FIG. 7.

At 1410, the method may include receiving a first stage WUS of the two stage wakeup signaling using the first radio in accordance with the timing information, the first stage WUS indicating for the first radio to start monitoring for a second stage WUS of the two stage wakeup signaling. The operations of block 1410 may be performed in accordance with examples as disclosed herein. In some examples, aspects of the operations of 1410 may be performed by a wakeup message component 730 as described with reference to FIG. 7.

At 1415, the method may include monitoring for the second stage WUS of the two stage wakeup signaling using the first radio based on receiving the first stage WUS, the second stage WUS indicating to wake up the second radio of the UE. The operations of block 1415 may be performed in accordance with examples as disclosed herein. In some examples, aspects of the operations of 1415 may be performed by a monitoring component 735 as described with reference to FIG. 7.

At 1420, the method may include monitoring one or more low power discontinuous reception occasions using the first radio for the second stage WUS, where the timing information indicates the one or more low power discontinuous reception occasions. The operations of block 1420 may be performed in accordance with examples as disclosed herein. In some examples, aspects of the operations of 1420 may be performed by a DRX timing component 740 as described with reference to FIG. 7.

FIG. 15 shows a flowchart illustrating a method 1500 that supports two stage WUSs for a low power radio in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving control signaling indicating timing information associated with monitoring for two stage wakeup signaling using a first radio of the UE, the first radio consuming less power than a second radio of the UE. The operations of block 1505 may be performed in accordance with examples as disclosed herein. In some examples, aspects of the operations of 1505 may be performed by a wakeup signal timing component 725 as described with reference to FIG. 7.

At 1510, the method may include receiving a first stage WUS of the two stage wakeup signaling using the first radio in accordance with the timing information, the first stage WUS indicating for the first radio to start monitoring for a second stage WUS of the two stage wakeup signaling. The operations of block 1510 may be performed in accordance with examples as disclosed herein. In some examples, aspects of the operations of 1510 may be performed by a wakeup message component 730 as described with reference to FIG. 7.

At 1515, the method may include monitoring for the second stage WUS of the two stage wakeup signaling using the first radio based on receiving the first stage WUS, the second stage WUS indicating to wake up the second radio of the UE. The operations of block 1515 may be performed in accordance with examples as disclosed herein. In some examples, aspects of the operations of 1515 may be performed by a monitoring component 735 as described with reference to FIG. 7.

At 1520, the method may include monitoring a control channel using the second radio based on receiving the first stage WUS or the second stage WUS, or both. The operations of block 1520 may be performed in accordance with examples as disclosed herein. In some examples, aspects of the operations of 1520 may be performed by a monitoring component 735 as described with reference to FIG. 7.

FIG. 16 shows a flowchart illustrating a method 1600 that supports two stage WUSs for a low power radio in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting control signaling indicating timing information associated with monitoring for two stage wakeup signaling associated with a first radio of a UE, the first radio consuming less power than a second radio of the UE. The operations of block 1605 may be performed in accordance with examples as disclosed herein. In some examples, aspects of the operations of 1605 may be performed by a wakeup signal timing manager 1125 as described with reference to FIG. 11.

At 1610, the method may include transmitting a first stage WUS of the two stage wakeup signaling in accordance with the timing information, the first stage WUS indicating for the first radio of the UE to start monitoring for a second stage WUS of the two stage wakeup signaling. The operations of block 1610 may be performed in accordance with examples as disclosed herein. In some examples, aspects of the operations of 1610 may be performed by a wakeup message manager 1130 as described with reference to FIG. 11.

At 1615, the method may include transmitting the second stage WUS of the two stage wakeup signaling based on the first stage WUS, the second stage WUS indicating to wake up the second radio of the UE. The operations of block 1615 may be performed in accordance with examples as disclosed herein. In some examples, aspects of the operations of 1615 may be performed by a wakeup message manager 1130 as described with reference to FIG. 11.

FIG. 17 shows a flowchart illustrating a method 1700 that supports two stage WUSs for a low power radio in accordance with aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include transmitting control signaling indicating timing information associated with monitoring for two stage wakeup signaling associated with a first radio of a UE, the first radio consuming less power than a second radio of the UE. The operations of block 1705 may be performed in accordance with examples as disclosed herein. In some examples, aspects of the operations of 1705 may be performed by a wakeup signal timing manager 1125 as described with reference to FIG. 11.

At 1710, the method may include transmitting a first stage WUS of the two stage wakeup signaling in accordance with the timing information, the first stage WUS indicating for the first radio of the UE to start monitoring for a second stage WUS of the two stage wakeup signaling. The operations of block 1710 may be performed in accordance with examples as disclosed herein. In some examples, aspects of the operations of 1710 may be performed by a wakeup message manager 1130 as described with reference to FIG. 11.

At 1715, the method may include transmitting the second stage WUS of the two stage wakeup signaling based on the first stage WUS, the second stage WUS indicating to wake up the second radio of the UE. The operations of block 1715 may be performed in accordance with examples as disclosed herein. In some examples, aspects of the operations of 1715 may be performed by a wakeup message manager 1130 as described with reference to FIG. 11.

At 1720, the method may include transmitting control signaling to be received by the UE using the second radio and using a search space set group indicated by a payload of the first stage WUS. The operations of block 1720 may be performed in accordance with examples as disclosed herein. In some examples, aspects of the operations of 1720 may be performed by a control signaling manager 1140 as described with reference to FIG. 11.

The following provides an overview of aspects of the present disclosure:

Aspect 1: A method for wireless communications at a UE, comprising: receiving control signaling indicating timing information associated with monitoring for two stage wakeup signaling using a first radio of the UE, the first radio consuming less power than a second radio of the UE; receiving a first stage WUS of the two stage wakeup signaling using the first radio in accordance with the timing information, the first stage WUS indicating for the first radio to start monitoring for a second stage WUS of the two stage wakeup signaling; and monitoring for the second stage WUS of the two stage wakeup signaling using the first radio based at least in part on receiving the first stage WUS, the second stage WUS indicating to wake up the second radio of the UE.

Aspect 2: The method of aspect 1, wherein receiving the second stage WUS comprises: monitoring one or more low power DRX occasions using the first radio for the second stage WUS, wherein the timing information indicates the one or more low power DRX occasions.

Aspect 3: The method of any of aspects 1 through 2, wherein receiving the second stage WUS comprises: monitoring for the second stage WUS beginning at a start time indicated by the first stage WUS or the timing information, or both.

Aspect 4: The method of any of aspects 1 through 3, wherein the timing information or the first stage WUS, or both, indicates a start time of a time window for monitoring for the second stage WUS, a periodicity of the time window, a duration of the time window, or any combination thereof.

Aspect 5: The method of any of aspects 1 through 4, further comprising: monitoring a control channel using the second radio based at least in part on receiving the first stage WUS or the second stage WUS, or both.

Aspect 6: The method of aspect 5, wherein monitoring for the control channel comprises: monitoring for the control channel using the second radio in a search space set group indicated by a payload of the first stage WUS.

Aspect 7: The method of any of aspects 1 through 6, further comprising: skipping monitoring of an on duration of a DRX cycle, a SSB, a RRM measurement, a RLM measurement, a CSI-RS, a downlink channel, a downlink signal, an uplink channel, an uplink signal, a cell deactivation, a secondary cell switch, a bandwidth part switch for the second radio, or any combination thereof, based at least in part on the first stage WUS or the second stage WUS, or both.

Aspect 8: The method of any of aspects 1 through 7, wherein receiving the second stage WUS comprises: receiving the second stage WUS while operating in a connected mode.

Aspect 9: A method for wireless communications at a network entity, comprising: transmitting control signaling indicating timing information associated with monitoring for two stage wakeup signaling associated with a first radio of a UE, the first radio consuming less power than a second radio of the UE; transmitting a first stage WUS of the two stage wakeup signaling in accordance with the timing information, the first stage WUS indicating for the first radio of the UE to start monitoring for a second stage WUS of the two stage wakeup signaling; and transmitting the second stage WUS of the two stage wakeup signaling based at least in part on the first stage WUS, the second stage WUS indicating to wake up the second radio of the UE.

Aspect 10: The method of aspect 9, wherein transmitting the second stage WUS comprises: transmitting the second stage WUS during one or more low power DRX occasions associated with the first radio, wherein the timing information indicates the one or more low power DRX occasions.

Aspect 11: The method of any of aspects 9 through 10, wherein transmitting the second stage WUS comprises: transmitting the second stage WUS beginning at a start time indicated by the first stage WUS or the timing information, or both.

Aspect 12: The method of any of aspects 9 through 11, wherein the timing information or the first stage WUS, or both, indicates a start time of a window for the second stage WUS, a periodicity of the window, a duration of the window, or any combination thereof.

Aspect 13: The method of any of aspects 9 through 12, wherein the timing information is based at least in part on a jitter of communications between the network entity and the UE.

Aspect 14: The method of any of aspects 9 through 13, further comprising: transmitting control signaling to be received by the UE using the second radio and using a search space set group indicated by a payload of the first stage WUS.

Aspect 15: The method of any of aspects 9 through 14, wherein transmitting the first stage WUS comprises: transmitting the first stage WUS including an indication for the UE to skip an on duration of a DRX cycle, a SSB, a RRM measurement, a RLM measurement, a CSI-RS, a downlink channel, a downlink signal, an uplink channel, an uplink signal, a cell deactivation, a secondary cell switch, a bandwidth part switch for the second radio, or any combination thereof.

Aspect 16: A UE for wireless communications, comprising one or more memories storing processor-executable code, and one or more processors coupled with the one or more memories and individually or collectively operable to execute the code to cause the UE to perform a method of any of aspects 1 through 8.

Aspect 17: A UE for wireless communications, comprising at least one means for performing a method of any of aspects 1 through 8.

Aspect 18: A non-transitory computer-readable medium storing code for wireless communications, the code comprising instructions executable by a processor to perform a method of any of aspects 1 through 8.

Aspect 19: A network entity for wireless communications, comprising one or more memories storing processor-executable code, and one or more processors coupled with the one or more memories and individually or collectively operable to execute the code to cause the network entity to perform a method of any of aspects 9 through 15.

Aspect 20: A network entity for wireless communications, comprising at least one means for performing a method of any of aspects 9 through 15.

Aspect 21: A non-transitory computer-readable medium storing code for wireless communications, the code comprising instructions executable by a processor to perform a method of any of aspects 9 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:
1. A user equipment (UE), comprising:
one or more memories storing processor-executable code; and
one or more processors coupled with the one or more memories and individually or collectively operable to execute the code to cause the UE to:
receive control signaling indicating timing information associated with monitoring for two stage wakeup signaling using a first radio of the UE, the first radio consuming less power than a second radio of the UE;
receive a first stage wakeup signal of the two stage wakeup signaling using the first radio in accordance with the timing information, the first stage wakeup signal comprising one or more bits that indicate a start time of a time window to monitor for a second stage wakeup signal of the two stage wakeup signaling using the first radio; and
monitor for the second stage wakeup signal of the two stage wakeup signaling during the time window using the first radio based at least in part on receiving the first stage wakeup signal and the indicated start time of the time window, the second stage wakeup signal indicating to wake up the second radio of the UE.

2. The UE of claim 1, wherein, to receive the second stage wakeup signal, the one or more processors are individually or collectively operable to execute the code to cause the UE to:

monitor one or more low power discontinuous reception occasions using the first radio for the second stage wakeup signal, wherein the timing information indicates the one or more low power discontinuous reception occasions.

3. The UE of claim 1, wherein the timing information or the first stage wakeup signal, or both, indicates a periodicity of the time window, a duration of the time window, or any combination thereof.

4. The UE of claim 1, wherein the one or more processors are individually or collectively further operable to execute the code to cause the UE to:

monitor a control channel using the second radio based at least in part on receiving the first stage wakeup signal or the second stage wakeup signal, or both.

5. The UE of claim 4, wherein, to monitor for the control channel, the one or more processors are individually or collectively operable to execute the code to cause the UE to:

monitor for the control channel using the second radio in a search space set group indicated by a payload of the first stage wakeup signal.

6. The UE of claim 1, wherein the one or more processors are individually or collectively further operable to execute the code to cause the UE to:

skip monitoring of an on duration of a discontinuous reception cycle, a synchronization signal block, a radio resource management measurement, a radio link monitoring measurement, a channel state information reference signal, a downlink channel, a downlink signal, an uplink channel, an uplink signal, a cell deactivation, a secondary cell switch, a bandwidth part switch for the second radio, or any combination thereof, based at least in part on the first stage wakeup signal or the second stage wakeup signal, or both.

7. The UE of claim 1, wherein, to receive the second stage wakeup signal, the one or more processors are individually or collectively operable to execute the code to cause the UE to:

receive the second stage wakeup signal while operating in a connected mode.

8. A network entity, comprising:

one or more memories storing processor-executable code; and one or more processors coupled with the one or more memories and individually or collectively operable to execute the code to cause the network entity to:

transmit control signaling indicating timing information associated with monitoring for two stage wakeup signaling associated with a first radio of a user equipment (UE), the first radio consuming less power than a second radio of the UE;

transmit a first stage wakeup signal of the two stage wakeup signaling in accordance with the timing information, the first stage wakeup signal comprising one or more bits that indicate a start time of a time window for the UE to monitor for a second stage wakeup signal of the two stage wakeup signaling using the first radio; and transmit the second stage wakeup signal of the two stage wakeup signaling during the time window based at least in part on the first stage wakeup signal and the indicated start time of the time window, the second stage wakeup signal indicating to wake up the second radio of the UE.

9. The network entity of claim 8, wherein, to transmit the second stage wakeup signal, the one or more processors are individually or collectively operable to execute the code to cause the network entity to:

transmit the second stage wakeup signal during one or more low power discontinuous reception occasions associated with the first radio, wherein the timing information indicates the one or more low power discontinuous reception occasions.

10. The network entity of claim 8, wherein the timing information or the first stage wakeup signal, or both, indicates a periodicity of the time window, a duration of the time window, or any combination thereof.

11. The network entity of claim 8, wherein the timing information is based at least in part on a jitter of communications between the network entity and the UE.

12. The network entity of claim 8, wherein the one or more processors are individually or collectively further operable to execute the code to cause the network entity to:

transmit control signaling to be received by the UE using the second radio and using a search space set group indicated by a payload of the first stage wakeup signal.

13. The network entity of claim 8, wherein, to transmit the first stage wakeup signal, the one or more processors are individually or collectively operable to execute the code to cause the network entity to:

transmit the first stage wakeup signal including an indication for the UE to skip an on duration of a discontinuous reception cycle, a synchronization signal block, a radio resource management measurement, a radio link monitoring measurement, a channel state information reference signal, a downlink channel, a downlink signal, an uplink channel, an uplink signal, a cell deactivation, a secondary cell switch, a bandwidth part switch for the second radio, or any combination thereof.

14. A method for wireless communications at a user equipment (UE), comprising:

receiving control signaling indicating timing information associated with monitoring for two stage wakeup signaling using a first radio of the UE, the first radio consuming less power than a second radio of the UE;

receiving a first stage wakeup signal of the two stage wakeup signaling using the first radio in accordance with the timing information, the first stage wakeup signal comprising one or more bits that indicate a start time of a time window to monitor for a second stage wakeup signal of the two stage wakeup signaling using the first radio; and monitoring for the second stage wakeup signal of the two stage wakeup signaling during the time window using the first radio based at least in part on receiving the first stage wakeup signal and the indicated start time of the time window, the second stage wakeup signal indicating to wake up the second radio of the UE.

15. The method of claim 14, wherein receiving the second stage wakeup signal comprises:

monitoring one or more low power discontinuous reception occasions using the first radio for the second stage wakeup signal, wherein the timing information indicates the one or more low power discontinuous reception occasions.

16. The method of claim 14, wherein the timing information or the first stage wakeup signal, or both, indicates a periodicity of the time window, a duration of the time window, or any combination thereof.

17. The method of claim 14, further comprising:
monitoring a control channel using the second radio based at least in part on receiving the first stage wakeup signal or the second stage wakeup signal, or both.

18. The method of claim 17, wherein monitoring for the control channel comprises:
monitoring for the control channel using the second radio in a search space set group indicated by a payload of the first stage wakeup signal.

19. The method of claim 14, further comprising:
skipping monitoring of an on duration of a discontinuous reception cycle, a synchronization signal block, a radio resource management measurement, a radio link monitoring measurement, a channel state information reference signal, a downlink channel, a downlink signal, an uplink channel, an uplink signal, a cell deactivation, a secondary cell switch, a bandwidth part switch for the second radio, or any combination thereof, based at least in part on the first stage wakeup signal or the second stage wakeup signal, or both.

20. The method of claim 14, wherein receiving the second stage wakeup signal comprises:
receiving the second stage wakeup signal while operating in a connected mode.

21. A method for wireless communications at a network entity, comprising:
transmitting control signaling indicating timing information associated with monitoring for two stage wakeup signaling associated with a first radio of a user equipment (UE), the first radio consuming less power than a second radio of the UE;
transmitting a first stage wakeup signal of the two stage wakeup signaling in accordance with the timing information, the first stage wakeup signal comprising one or more bits that indicate a start time of a time window for the UE to monitor for a second stage wakeup signal of the two stage wakeup signaling using the first radio; and transmitting the second stage wakeup signal of the two stage wakeup signaling during the time window based at least in part on the first stage wakeup signal and the indicated start time of the time window, the second stage wakeup signal indicating to wake up the second radio of the UE.

22. The method of claim 21, wherein transmitting the second stage wakeup signal comprises:
transmitting the second stage wakeup signal during one or more low power discontinuous reception occasions associated with the first radio, wherein the timing information indicates the one or more low power discontinuous reception occasions.

23. The method of claim 21, wherein the timing information or the first stage wakeup signal, or both, indicates a periodicity of the time window, a duration of the time window, or any combination thereof.

24. The method of claim 21, wherein the timing information is based at least in part on a jitter of communications between the network entity and the UE.

25. The method of claim 21, further comprising:
transmitting control signaling to be received by the UE using the second radio and using a search space set group indicated by a payload of the first stage wakeup signal.

26. The method of claim 21, wherein transmitting the first stage wakeup signal comprises:
transmitting the first stage wakeup signal including an indication for the UE to skip an on duration of a discontinuous reception cycle, a synchronization signal block, a radio resource management measurement, a radio link monitoring measurement, a channel state information reference signal, a downlink channel, a downlink signal, an uplink channel, an uplink signal, a cell deactivation, a secondary cell switch, a bandwidth part switch for the second radio, or any combination thereof.

* * * * *